United States Patent
Goldman et al.

(10) Patent No.: US 11,726,473 B2
(45) Date of Patent: Aug. 15, 2023

(54) AUTONOMOUS VEHICLE GUIDANCE AUTHORITY FRAMEWORK

(71) Applicant: Zoox, Inc., Foster City, CA (US)

(72) Inventors: Meredith James Goldman, Redwood City, CA (US); Frank Reinaldo Ramirez, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 381 days.

(21) Appl. No.: 16/184,958

(22) Filed: Nov. 8, 2018

(65) Prior Publication Data
US 2020/0150653 A1 May 14, 2020

(51) Int. Cl.
G05D 1/00 (2006.01)
G05D 1/02 (2020.01)

(52) U.S. Cl.
CPC ......... G05D 1/0088 (2013.01); G05D 1/0212 (2013.01)

(58) Field of Classification Search
CPC ............... G05D 1/0088; G05D 1/0212; G05D 2201/0213; G05D 1/0022; G05D 1/0055; H04L 63/108; H04W 4/024; H04W 4/40; H04W 12/08; B60R 25/24
See application file for complete search history.

(56) References Cited

U.S. PATENT DOCUMENTS

| | | | |
|---|---|---|---|
| 2013/0204493 A1 | 8/2013 | Ricci et al. | |
| 2016/0019125 A1* | 1/2016 | Madduri | H04L 41/5009 714/4.11 |
| 2016/0264131 A1* | 9/2016 | Chan | A61B 5/6893 |
| 2019/0210560 A1* | 7/2019 | Decia | G07C 9/00 |
| 2020/0047773 A1* | 2/2020 | Akaba | G08G 1/16 |

FOREIGN PATENT DOCUMENTS

WO    WO2018038700 A1    3/2018

OTHER PUBLICATIONS

PCT Search Report and Written Opinion dated Feb. 28, 2020, for PCT Application No. PCT/US2019/059932, 13 pages.
European Office Action dated Feb. 8, 2022 for European Application No. 19836653.6, a foreign counterpart to U.S. Appl. No. 16/184,958, 8 pages.
European Office Action dated Oct. 25, 2022 for European Application No. 19836653.6, a foreign counterpart to U.S. Appl. No. 16/184,958, 7 pages.

* cited by examiner

*Primary Examiner* — Jess Whittington
*Assistant Examiner* — Brian E Yang
(74) *Attorney, Agent, or Firm* — Lee & Hayes, P.C.

(57) ABSTRACT

A vehicle may include an authority tracker to grant and/or limit authority to provide guidance to the vehicle. The authority tracker may store a state in a memory identifying an actor that currently has the authority. An actor requesting to have authority to provide guidance to the vehicle may transmit a control message to the authority tracker which may, in turn, authorize or deny the request based on a policy. The authority tracker may periodically, and/or in response to a request, broadcast a state message identifying the actor that currently has authority, as recorded in the memory.

19 Claims, 9 Drawing Sheets

AUTONOMOUS VEHICLE GUIDANCE AUTHORITY FRAMEWORK

BACKGROUND

Autonomous vehicles rely on a variety of systems and methods for safely and efficiently navigating the world. At times, though, an autonomous vehicle may receive guidance from outside the system of the autonomous vehicle. For example, a teleoperator may provide a new route to the autonomous vehicle to re-route the autonomous vehicle past an accident that isn't reflected in a global map yet, or a passenger may identify a passerby as being an individual the autonomous vehicle should pick up. However, if the autonomous vehicle receives conflicting guidance, such as concurrent guidance from two different actors, the safety and efficiency of the autonomous vehicle may be compromised.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
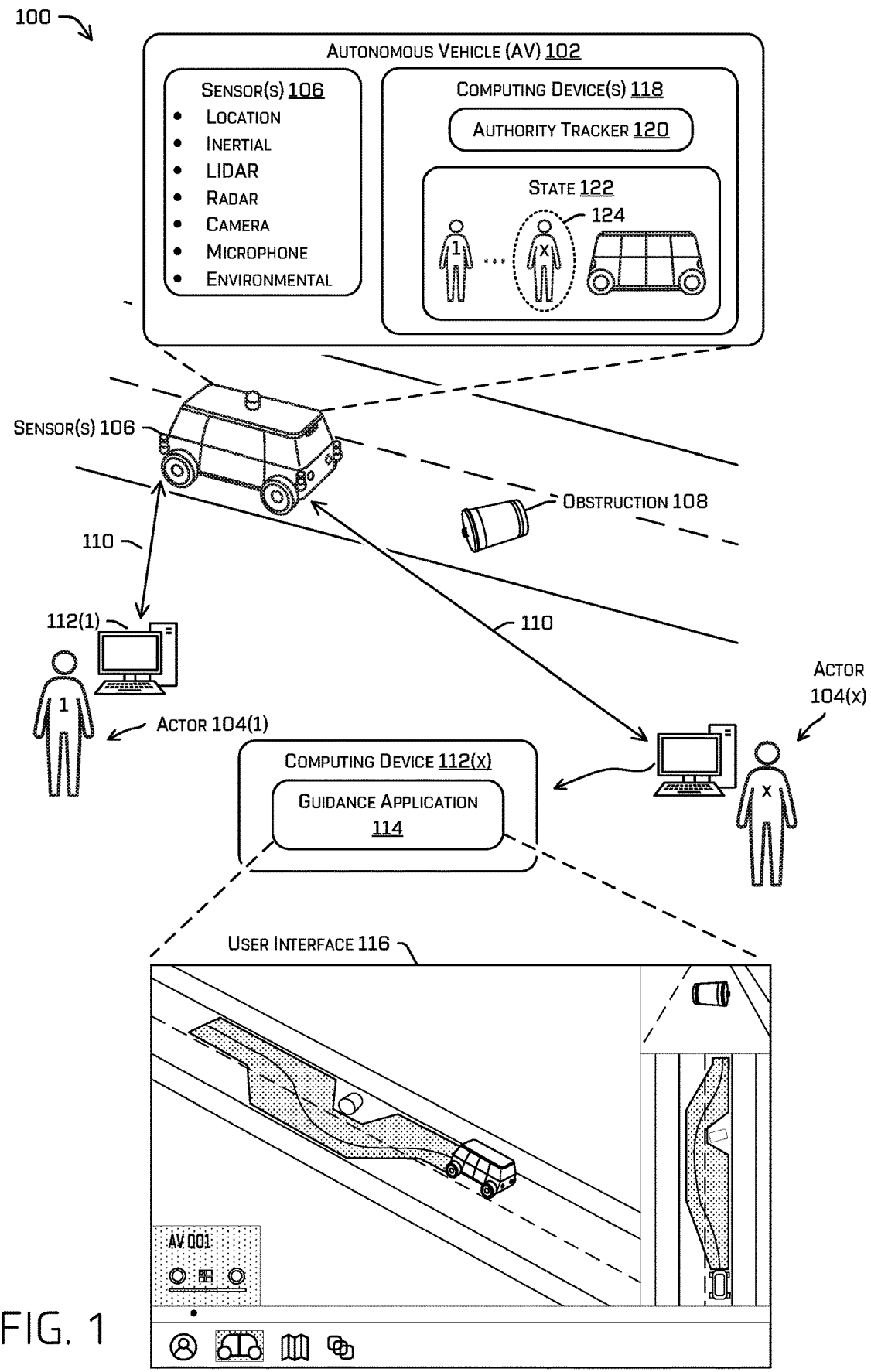
FIG. 1 illustrates an example scenario depicting an autonomous vehicle and two example actors where authority to provide guidance to the autonomous vehicle may be limited to one or more actors.

As discussed above, if an autonomous vehicle receives conflicting guidance, such as concurrent guidance from two different actors, the safety and efficiency of the autonomous vehicle may be compromised. This application describes techniques that avoid conflicting guidance from multiple different actors. For instance, this application describes techniques for granting authority to an actor to provide guidance to an autonomous vehicle, transitioning the authority between actors, and tracking which actor has the authority. Guidance may comprise a command (e.g., one or more sets of instructions to be performed by the autonomous vehicle), a collaborative instruction (e.g., an instruction by which some information is provided to the autonomous vehicle and the autonomous vehicle is capable of using such information to control itself), a confirmation (e.g., one or more signals indicative that a proposed command determined by the autonomous vehicle should be executed), and/or ride control instructions. In some instances, the techniques may include limiting authority to a single actor at a time.

In some instances, an autonomous vehicle may track who has authority to provide guidance to the autonomous vehicle and the autonomous vehicle may exclude actors other than the actor that currently has authority ("engaged actor," herein) from providing guidance to the autonomous vehicle. In additional or alternate examples, another computing device, such as a cloud-based service, may track who has authority. In some instances, the engaged actor may be a human and/or an artificial intelligence (AI) component. Although it is contemplated that the actor may comprise more than one actor, only one actor may provide guidance to one component of the autonomous vehicle at a time.

For example, if two actors have authority to provide guidance to the autonomous vehicle, the two actors may be excluded from providing guidance to a same component of the autonomous vehicle but may provide guidance to two different components of the autonomous vehicle. To give an illustration, a first actor may have authority to provide guidance to a planner component of the autonomous vehicle (e.g., providing a proposed path to navigate a construction zone) and a second actor may have authority to provide internal temperature controls for passenger comfort. Regardless, as discussed herein, a first actor that has "authority" is permitted by the authority tracker to provide guidance to at least a component of the autonomous vehicle while a second actor (and/or any other actors) is excluded, by the authority tracker, from providing guidance to that same component, without the authority tracker first transitioning authority from the first actor to the second actor. For example, any guidance received from an excluded actor may be ignored and/or a request received from an excluded actor for the autonomous vehicle to conduct an operation may be denied. In some instances, an application running on a device associated with an actor will not populate a user interface with options to transmit guidance to the autonomous vehicle and/or the device may not transmit guidance to the autonomous vehicle until a state broadcast from the autonomous vehicle indicates that the actor has authority.

In some instances, the guidance may comprise data that is otherwise unavailable to the autonomous vehicle via one or more sensors of the autonomous vehicle (e.g., knowledge or directions of a passenger, such as, an instruction to pick up an additional passenger or an identification of the additional passenger from among a number of passersby), a confirmation of an output of a component of the autonomous vehicle, a collaborative instruction, or a command.

In some instances, the autonomous vehicle (and/or whatever device is tracking who has authority) may comprise an authority tracker that is configured with a policy that specifies one or more conditions in response to which authority may transition from one actor to another actor. For example, the policy may comprise a state machine that specifies at least one of a role (e.g., teleoperator, ride operator, supervisor, super user), a state, or an action for which authority may transition from one actor to another actor. For example, a teleoperator may provide guidance regarding motion of the autonomous vehicle and/or exterior emitter actions (e.g., turn on lights, make a sound via a speaker), a ride operation may provide guidance to different component(s) of the autonomous vehicle related to passenger interaction with the vehicle (e.g., open a door of the autonomous vehicle, identify a passenger associated with the autonomous vehicle, change an internal temperature of the autonomous vehicle), a supervisor may be associated with other actor(s), and/or a super user may be a special actor for closed-course testing of the autonomous vehicle and may comprise a test-driver, for example, that is override the policy. The authority tracker may store, in a memory, a state that identifies who currently has authority (the "engaged actor") to provide guidance to the autonomous vehicle, an identification of the autonomous vehicle and/or component of the autonomous vehicle over which the actor has authority, an identifier of a second actor that may take authority, and/or a status (e.g., success, failure, timeout, awaiting handoff, escalating). In some instances, the authority tracker may periodically transmit (publish), over a "state" channel to one or more devices subscribing to the state channel, the state currently stored in the memory.

The state may remain unmodified until the authority tracker authorizes a transition of authority. When the authority tracker authorizes a second actor to take authority (i.e., the authority transitions from a first actor to the second actor), the authority tracker may replace a first state stored in memory identifying a first actor as having authority with a second state identifying the second actor as having the authority.

In some instances, to receive requests for transitioning authority to a different actor, the authority tracker may subscribe to a "control" channel and may trigger an evaluation of the policy based at least in part on determining that a request sent over the control channel comprises an identifier of the autonomous vehicle (and/or a component thereof). In some instances, a request (e.g., a control message) received over the control channel may comprise at least one of an action, a target identifier (e.g., which autonomous vehicle and/or which component is targeted by the message), a source identifier (e.g., an identifier associated with an actor), and/or a second target identifier (e.g., when a first actor is seeking to transfer authority to a second actor).

An action may comprise, for example, a takeover message, a relinquish message, a handoff message, an escalate message, and/or a rejection message. The takeover message may indicate that the actor sending the takeover message is requesting a transition of authority from an engaged actor to the requesting actor. The relinquish message may indicate that an actor that currently has authority is giving up the authority, causing authority to revert to a former holder of authority (who may be identified by the second identifier), a default holder of authority (e.g. the autonomous vehicle), and/or to the autonomous vehicle. The handoff message may indicate that the engaged actor requests to transfer authority to a different actor. The escalation message may indicate that an engaged actor requests to transfer authority to a supervising actor.

In some instances, the authority tracker may be communicatively coupled to a directory service that publishes and/or serves user information such as identifiers (e.g., usernames) associated with actors authorized to take authority, a role associated with an actor, a host name (e.g., an identification of a computing device associated with an actor), a process name of a guidance application running on the computing device (e.g., a ride experience process, a collaborative instruction process, a driving envelope modification process, a route modification process, a city event notification process), and/or a hash thereof. In some instances, control messages may comprise user information of an actor that generated the control message and the authority tracker may verify that the actor is verified by the directory service before determining whether or not to grant authority to the actor.

The techniques described herein may improve the safety and efficiency of an autonomous vehicle. In instances where multiple actors attempt to provide guidance to the autonomous vehicle, the techniques discussed herein may reduce the time it takes for an autonomous vehicle to continue operating or to operate normally and may reduce computational cycles to determine which guidance to implement and/or to correct mistakes made by attempting to implement conflicting guidance.

Example Scenario

FIG. 1 illustrates an example scenario 100 including an autonomous vehicle 102 and actor(s) 104(1)-(x). Although the actor(s) 104(1)-(x) are depicted as representations of humans, an actor 104(x) may comprise a human, an AI component, and/or any other device. Although the discussion herein primarily uses a vehicle or an autonomous vehicle as an example, it is contemplated that the techniques discussed herein may be applied to any other scenario where two or more actors are available to supply guidance and/or instructions to a machine and/or where contemporaneous overlapping inputs may cause a degradation of machine operation.

In some instances, the autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification. Moreover, in some instances, the guidance isolation techniques described herein may be usable by non-autonomous vehicles as well.

According to the techniques discussed herein, the autonomous vehicle 102 may receive sensor data from sensor(s) 106 of the autonomous vehicle 102. For example, the sensor data may include a location signal (e.g., a GPS signal), an inertia signal (e.g., an accelerometer signal, a gyroscope signal, etc.), a magnetometer signal, a wheel encoder signal, a speedometer signal, a point cloud of accumulated LIDAR and/or RADAR points, an image (or images), an audio signal, and/or bariatric or other environmental signals, etc. The autonomous vehicle 102 may use sensor data received from such sensor(s) 106 to determine a trajectory for controlling motion of the autonomous vehicle 102 and/or a confidence level associated with the trajectory indicating a probability that the autonomous vehicle 102 is operating safely and/or efficiently.

In the course of operating according to the example scenario 100, the autonomous vehicle 102 has come upon an obstruction 108 depicted as a fallen trash can. In some instances, based at least in part on determining that a confidence level associated with a trajectory for controlling the autonomous vehicle 102 does not meet a threshold confidence, the autonomous vehicle 102 may generate a teleoperation request. The autonomous vehicle 102 may transmit, via a network 110, the teleoperation request to computing devices 112(1)-(x) associated with the actor(s) 104(1)-(x). This teleoperation request may be an indication that the autonomous vehicle 102 is seeking guidance. However, it is contemplated that the autonomous vehicle 102 does not need to seek guidance to receive guidance and/or for an actor 104(x) to seek to take authority to provide guidance to the autonomous vehicle 102. For example, a passenger may provide guidance, a nearby remote operator may provide guidance and/or direct control, a passerby may provide guidance, a teleoperator may provide guidance, etc. In instances where a passenger or passerby provides guidance to the autonomous vehicle 102, the passenger or passerby may not be aware that, in providing guidance to the autonomous vehicle 102 via a computing device associated with the passenger or passerby, an application running on the computing device may generate a request to take authority, as discussed herein.

In some instances, a computing device 112(x) may comprise a guidance application 114. The guidance application 114 may be configured to generate and transmit, over a control channel, a control message and/or to receive state messages over a state channel. For example, the network 110 may be configured to route control messages from autonomous vehicle(s) and/or actor(s) that publish the control messages to subscribers of the control channel and/or route state messages from autonomous vehicle(s) that publish state messages to subscribers of the state channel. The guidance application 114, when executed by the computing device 112(x), may additionally, or alternatively, cause display of a user interface 116. The user interface 116 may comprise selectable elements that, upon activation, may generate guidance comprising computer-executable instructions and/or logic. Another component of the user interface 116 may be selectable to cause the computing device 112(x) to transmit the computer-executable instructions via the network 110 to the autonomous vehicle 102.

In some instances, the guidance may comprise additional data (e.g., identification of an individual by a passenger/passerby, identification of an exigent circumstance of which the autonomous vehicle 102 may be unaware, e.g., an object lodged in a tire or in the undercarriage), a command, a collaborative instruction, and/or a confirmation. For example, the computer-executable instructions of the guidance may comprise:
- a command (e.g., one or more sets of instructions to be performed by the autonomous vehicle 102) including one or more of:
  - a trajectory for the autonomous vehicle 102,
  - activating a horn of the autonomous vehicle 102,
  - a modification to the driveline of the autonomous vehicle 102,
  - turning on hazard lights of the autonomous vehicle 102,
  - flashing lights of the autonomous vehicle 102,
  - holding the autonomous vehicle 102 in position,
  - inching the autonomous vehicle 102 forward,
  - pulling the autonomous vehicle 102 over,
  - using an external and/or internal speaker,
  - opening one or more doors of the vehicle, or
  - a reverse and/or forward nudge;
- a collaborative instruction (e.g., an instruction by which some information is provided to the autonomous vehicle 102 and the autonomous vehicle 102 is capable of using such information to control itself) including one or more of:
  - modifying a route of the autonomous vehicle 102,
  - modifying an object classification,
  - modifying an object track,
  - a waypoint,
  - modifying an event and/or other classification data (e.g., changing and/or adding an object label or event label),
  - providing an additional classification and/or contextual information (e.g., creating a new label, temporarily relaxing an associated indication of unpredictability, for example, where a "dog in road" event might be associated with an unpredictable label the teleoperator may see that the dog is merely sitting off to the side of the roadway and may provide an indication of increased predictability to the autonomous vehicle 102),
  - modifying a prediction generated by the autonomous vehicle 102 (e.g., the autonomous vehicle 102 might predict that a soccer player is likely to run into the street because of their current trajectory, but a modification of the prediction could reduce that likelihood because of the teleoperator's perception of the boundaries of the soccer field and its proximity to the road),
  - creating a new rule associated with data identified by the autonomous vehicle 102 (e.g., storing a new state in a finite state machine of the autonomous vehicle 102 that configures the autonomous vehicle 102 to classify a combination of inputs with a newly associated classification and/or to perform an operation),
  - classifying an area (e.g., identifying an area as being an accident scene for 30 minutes, which may cause other vehicles of the fleet to re-route), or
  - expanding a driving corridor of the autonomous vehicle 102, so that the autonomous vehicle 102 can plan a collision-free trajectory;
- a confirmation (e.g., one or more signals indicative that a proposed command determined by the autonomous vehicle 102 should be executed) of a determination of the autonomous vehicle 102 of a trajectory, classification, prediction, use of horn and/or lights, rule to relax (e.g., driving corridor expansion), parameter alteration (e.g., speed limit decrease due to school zone, speed limit increase due to poor health of passenger), and/or an area classification; and/or
- ride control instructions that modify conditions affecting a passenger including one or more of:
  - adjusting a temperature of an interior of the vehicle,
  - adjusting a damping of a suspension system of the vehicle,
  - presenting image, audio, and/or video via input/output (I/O) device(s) of the interiors of the vehicle, and/or
  - toggling interior-interior and/or exterior-interior noise-cancelling.

In the illustrated example, the actor 104(x) may transmit, via the guidance application 114a control message, over the control channel on network 110, a request that may include a takeover message identifying the autonomous vehicle 102 and/or identifying the actor 104(x). The autonomous vehicle 102 may include computing device(s) 118 that may run an authority tracker 120. Although depicted in FIG. 1 as being in the autonomous vehicle 102 for illustrative purposes, such an authority tracker 120 may be remote therefrom (e.g., as a cloud based service).

The authority tracker 120 may track which actor currently has authority (i.e., the "engaged actor") to provide guidance to the autonomous vehicle 102 and/or the authority tracker 120 may determine, based at least in part on a policy, when to transition authority from one actor to another. For example, the authority tracker 120 may receive the request from the actor 104(*x*) and, based at least in part on a policy, may determine to authorize the request. In some instances, the authority tracker 120 may track which actor has authority by storing a state 122 in a memory of the autonomous vehicle 102. Upon determining to authorize the request, the authority tracker may modify the state 122 stored in memory to indicate (124) that actor 104(*x*) has authority to provide guidance to the autonomous vehicle 102.

Note that the autonomous vehicle 102 itself may be one of the actors and, in some instances, the autonomous vehicle 102 may be a default actor to which authority reverts and from which authority springs. For example, state 122 depicts actors 104(1)-(*x*) and autonomous vehicle 102 as being potential actors that may have control and an indication (124) of the actor that actively possesses authority, which in this case is actor 104(*x*), as discussed below.

In some instances, authority is exclusive (i.e., no other actors may simultaneously have authority to provide guidance to a same autonomous vehicle 102 and/or component of the autonomous vehicle 102). However, when the authority tracker 120 grants authority to an actor other than the autonomous vehicle 102, the authority granted may be limited to providing guidance to particular component(s) of the autonomous vehicle. In other words, the autonomous vehicle 102 may reserve ultimate control of the autonomous vehicle 102 by continuing to generate a trajectory to control motion of the autonomous vehicle 102 and/or other such safety critical features. In some instances, the autonomous vehicle 102 may use guidance received from an actor that has authority as part of a determination of instructions for controlling the autonomous vehicle 102 (e.g., the guidance may modify a driving envelope and/or a route, but the autonomous vehicle 102 reserves control over generating a trajectory subject to that driving envelope and/or new route).

However, in some instances, such as during test-driving of the autonomous vehicle during experimental driving on a closed course, an actor associated with a super user role may transmit a takeover message that allows the actor to control even trajectory generation, such as by reverting the autonomous vehicle 102 to a semi-autonomous mode.

Once actor 104(*x*) has been granted authority by the authority tracker 120, as indicated (and canonized) by modifying the state 122 identify actor 104(*x*) as having authority, guidance received from actor 104(*x*), now the engaged actor, may be used, least in part, by the autonomous vehicle 102 in determining instructions to control the autonomous vehicle 102. In some instances, guidance received from actor 104(*x*) may be received via the network 110 from computing device 112(*x*) and/or guidance application 114.

A policy stored by the authority tracker 120 may determine how authority transitions back to the autonomous vehicle 102 ("reverts") and/or transitions to another actor. In some instances, authority may revert to the autonomous vehicle based at least in part on receiving a relinquish message from the engaged actor, determining that a connection between the engaged actor and the autonomous vehicle 102 has timed out (e.g., the guidance application 114 may periodically transmit keepalive messages and, upon failing to receive a keepalive message within a specified time period, authority may revert to the autonomous vehicle 102), and/or upon receiving a disengagement message from a super user (e.g., a test driver that is operating the autonomous vehicle 102 during a test on a closed course). In some examples, such a disengagement message may be autogenerated based on, for example, the autonomous vehicle 102 surpassing some obstacle, generating a trajectory having some threshold confidence, or otherwise determining that it no longer needs to rely on external guidance. In some instances, authority may transition to another actor based at least in part on receiving a handoff message and/or an escalation message, and/or upon determining that a connection to the engaged actor has timed out.

Example Architecture

Figure 2:
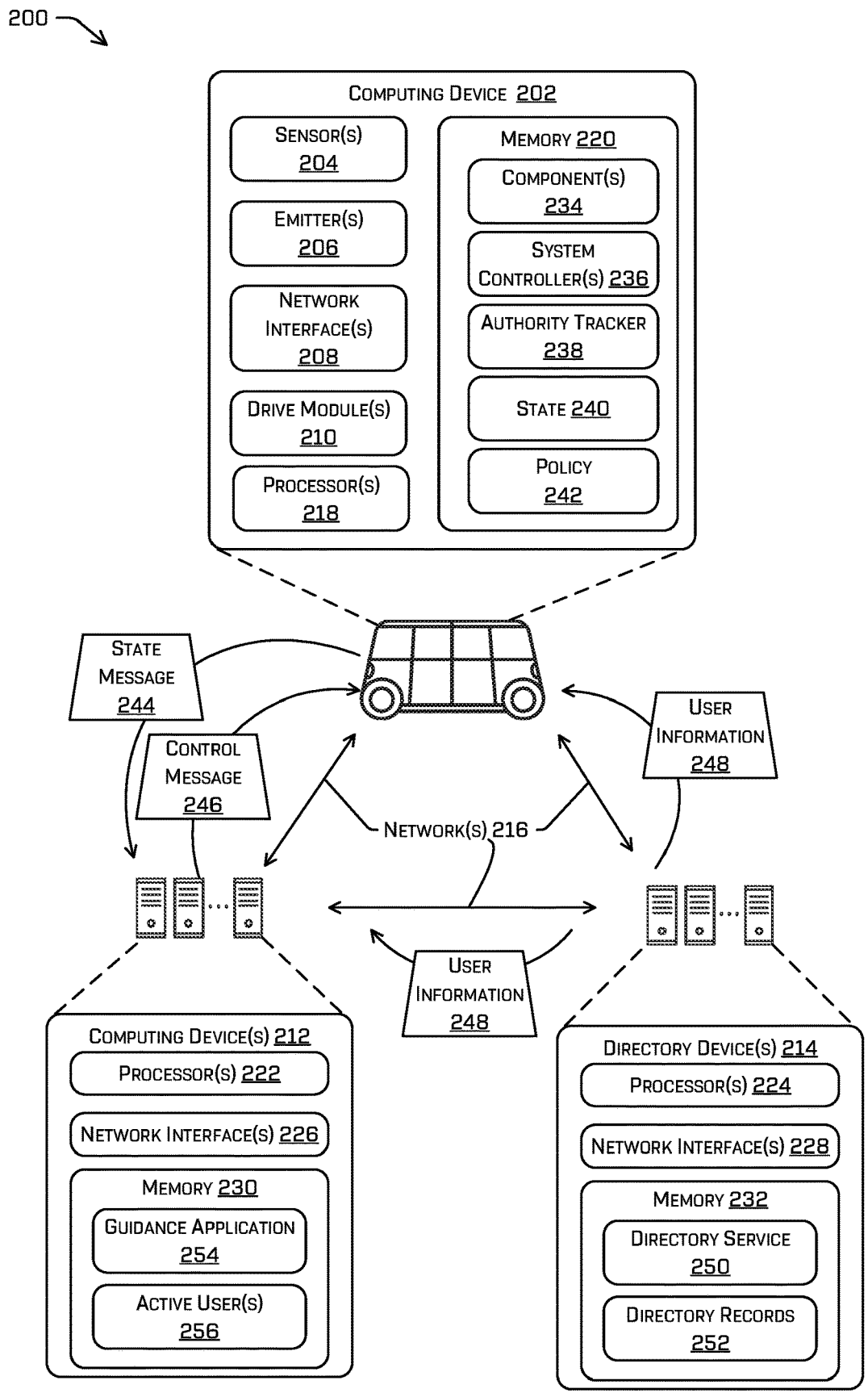
FIG. 2 illustrates a block diagram of an example system for granting authority to an actor and/or limiting guidance provided to the autonomous vehicle.

FIG. 2 depicts a block diagram of an example system 200 for implementing the techniques described herein. In some instances, the example system 200 may include a computing device 202. In the illustrated example, the computing device 202 comprises an autonomous vehicle; however, the computing device 202 may be any other type of computing device and/or semi-autonomous or non-autonomous vehicle. For example, computing device 202 may comprise autonomous vehicle 102.

The computing device 202 may include sensor(s) 204, emitter(s) 206, network interface(s) 208, and/or one or more drive modules 210. In some instances, the sensor(s) 204 may include light detection and ranging (LIDAR) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), etc. The sensor(s) 204 may include multiple instances of each of these or other types of sensors. For instance, the LIDAR sensors may include individual LIDAR sensors located at the corners, front, back, sides, and/or top of the computing device 202. As another example, the camera sensors may include multiple cameras disposed at various locations about the exterior and/or interior of the computing device 202. The sensor(s) 204 may provide input to the computing device 202.

The vehicle 202 may also include emitter(s) 206 for emitting light and/or sound, as described above. The emitter(s) 206 in this example include interior audio and visual emitter(s) to communicate with passengers of the computing device 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 206 in this example also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The computing device 202 may also include network interface(s) 208 that enable communication between the computing device 202 and one or more other local or remote computing device(s). For instance, the network interface (s) 208 may facilitate communication with other local computing device(s) on the computing device 202 and/or the drive module(s) 210. Also, the network interface (s) 208 may allow the vehicle to communicate with other nearby computing device(s) (e.g., other nearby vehicles, traffic signals, etc.). The network interface (s) 208 also enable the vehicle 202 to communicate with a computing device 212 associated with an actor and/or a computing device (directory device) 214 associated with a directory service.

The network interface(s) 208 may include physical and/or logical interfaces for connecting the computing device 202 to another computing device or a network, such as network(s) 216. For example, the network interface(s) 208 may enable Wi-Fi-based communication such as via frequencies defined by the IEEE 800.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In some instances, the computing device 202 may include one or more drive modules 210. In some instances, the computing device 202 may have a single drive module 210. In some instances, the drive module(s) 210 may include one or more sensors to detect conditions of the drive module(s) 210 and/or the surroundings of the computing device 202. By way of example and not limitation, the sensor(s) of the drive module(s) 210 may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders may be unique to the drive module(s) 210. In some cases, the sensor(s) on the drive module(s) 210 may overlap or supplement corresponding systems of the computing device 202 (e.g., sensor(s) 204).

The drive module(s) 210 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 210 may include a drive module controller which may receive and preprocess data from the sensor(s) and to control operation of the various vehicle systems. In some instances, the drive module controller may include one or more processors and memory communicatively coupled with the one or more processors. The memory may store one or more modules to perform various functionalities of the drive module(s) 210. Furthermore, the drive module(s) 210 may also include one or more communication connection(s) that enable communication by the respective drive module with one or more other local or remote computing device(s).

The computing device 202 may include one or more processors 218 and memory 220 communicatively coupled with the one or more processors 218. Computing device(s) 212 and/or 214 may also include processor(s) 222 and 224, network interface(s) 226 and 228, and/or memory 230 and 232, respectively. The processor(s) 218, 222, and/or 224 may be any suitable processor capable of executing instructions to process data and perform operations as described herein. By way of example and not limitation, the processor(s) 218, 222, and/or 224 may comprise one or more central processing units (CPUs), graphics processing units (GPUs), integrated circuits (e.g., application-specific integrated circuits (ASICs), etc.), gate arrays (e.g., field-programmable gate arrays (FPGAs), etc.), and/or any other device or portion of a device that processes electronic data to transform that electronic data into other electronic data that may be stored in registers and/or memory.

Memory 220, 230, and/or 232 may be examples of non-transitory computer-readable media. The memory 220, 230, and/or 232 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 of the computing device 202 may store component(s) 234 such as, for example, a perception component, a localization component, a planning component, and/or similar components that, when executed by the one or more processors 218, may perform various operations to operate the computing device 202.

For example, the perception component may include functionality to perform object detection, segmentation, and/or classification. In some instances, the perception component may provide processed sensor data that indicates a presence of an entity that is proximate to the computing device 202 and/or a classification of the entity as an entity type (e.g., car, pedestrian, cyclist, animal, building, tree, road surface, curb, sidewalk, unknown, etc.). In additional and/or alternative instances, the perception component may provide processed sensor data that indicates one or more characteristics associated with a detected entity and/or the environment in which the entity is positioned/oriented. In some instances, characteristics associated with an entity may include, but are not limited to, an x-position/orientation (global position/orientation), a y-position/orientation (global position/orientation), a z-position/orientation (global position/orientation), an orientation, an entity type (e.g., a classification), a velocity of the entity, an extent of the entity (size), sensor signal quality and/or other characteristics, an indication of an amount of features present in a signal, a clarity score associated with a sensor signal, etc. Characteristics associated with the environment may include, but are not limited to, a presence of another entity in the environment, a state of another entity in the environment, a time of day, a day of a week, a season, a weather condition, an indication of darkness/light, etc. In some instances, guidance may specify an output of the perception component (e.g., the classification of an entity, a characteristic of the environment, an event happening in a region in which the computing device 202 is located).

In some instances, the localization component may include functionality to receive data from the sensor(s) 204 to determine a map and/or position/orientation of the computing device 202. For example, the localization component may include and/or request/receive a map of an environment and may continuously determine a location of the autonomous vehicle within the map. In some instances, the localization component may utilize simultaneous localization and/or mapping (SLAM) and/or calibration, localization and/or mapping simultaneously (CLAMS), to receive image data, LIDAR data, RADAR data, IMU data, GPS data, wheel encoder data, and the like to accurately determine a location of the autonomous vehicle. In some instances, the localization component may provide data to various components of the computing device 202 to determine an initial position/orientation of an autonomous vehicle for generating a candidate trajectory, as discussed herein.

In general, the planning component may determine a path for the computing device 202 to follow to traverse through an environment. For example, the planning component may determine various routes and trajectories and various levels of detail. For example, the planning component may determine a route to travel from a first location (e.g., a current location) to a second location (e.g., a target location). For the purpose of this discussion, a route may be a sequence of waypoints for travelling between two locations. As non-limiting examples, waypoints include streets, intersections, coordinates (e.g., determined by the localization and/or mapping component and/or a GPS), etc. Further, the planning component may generate an instruction for guiding the computing device 202 along at least a portion of the route from the first location to the second location. In some instances, the planning component may determine how to guide the autonomous vehicle from a first waypoint in the sequence of waypoints to a second waypoint in the sequence of waypoints. In some instances, the instruction may be a trajectory, or a portion of a trajectory. In some instances, multiple trajectories may be substantially simultaneously generated (e.g., within technical tolerances) in accordance with a receding horizon technique. In some instances, and as discussed herein, the planning component may receive a map and/or position/orientation from the localization component and/or various data, such as identifications and/or classifications objects, events, and/or characteristics of the environment from the perception component.

In some instances, one or more of the component(s) 234 may be implemented in whole, or in part, as a neural network. As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms, instance-based algorithms, Bayesian algorithms, association rule learning algorithms, deep learning algorithms, etc. Additional or alternative examples of neural network architectures may include neural networks such as ResNet20, ResNet101, VGG, DenseNet, PointNet, and the like.

In some instances, the component(s) 234 may process sensor data, as described above, and may send their respective outputs, over the network(s) 216, to one or more computing device(s) 212. In some instances, the component(s) 234 may send their respective outputs to the one or more computing device(s) 212 at a particular frequency, after a lapse of a predetermined period of time, in near real-time, etc.

In some instances, the computing device 202 may send sensor data to one or more computing device(s) 212, via the network(s) 216. Computing device(s) 212 may represent computing device(s) 112(1)-($x$). In some instances, the vehicle 202 may send raw sensor data to the computing device(s) 212. In other examples, the computing device 202 may send processed sensor data and/or representations of sensor data to the computing device(s) 212.

In some instances, the memory 220 may further store one or more system controllers 236, which may be configured to control steering, propulsion, braking, safety, emitter(s), communication, and other systems of the computing device 202, such as by communicating instructions to the drive module(s) 210 and/or controlling corresponding systems of the drive module(s) 210 and/or other components of the computing device 202.

In some instances, the memory 220 may additionally, or alternatively, store an authority tracker 238 that, when executed by the one or more processors 218 may cause the computing device 202 to perform various actions discussed herein. The authority tracker 238 may store state 240 in the memory 220 to track an actor that currently has authority to provide guidance to the computing device 202. In some instances, the authority tracker 238 may determine to transition authority from a first actor to a second actor based at least in part on a policy 242 stored in memory 220.

In some instances, the policy 242 may comprise a state machine. The state machine may specify one or more conditions and an individual condition may be associated with a transition. For example, if a condition is satisfied, such as by receiving a request from an actor that specifies data that satisfies that condition (e.g., the requesting actor is able to take control given the actor's role, the situation, etc.), the authority tracker 238 may transition authority from a first actor to the requesting actor by updating the state 240 to reflect the requesting actor as the engaged actor and transmitting a state message 244 to the computing device(s) 212. Guidance subsequently received from the computing device(s) 212 associated with the engaged actor may be routed by the authority tracker 238 to the appropriate component(s) 234 identified by the state 240 and/or relevant to the guidance.

If a request doesn't satisfy the condition, the authority tracker 238 may maintain the current state 240 and, optionally, transmit the current state as the state message 244, thereby indicating that no change in authority has occurred. Transmitting the current state (instead of transmitting an updated state) may also function as a rejection message, although the authority tracker 238 may additionally, or alternatively, transmit a rejection message. Any guidance received from a computing device 212 that does not correspond with an actor identified as being the engaged actor by the state 240 may be ignored by the authority tracker 238. In other words, the state 240 may remain unmodified until the authority tracker 238 authorizes a transition of authority.

In some instances, a condition of the policy 242 may comprise at least one of an action, a role, or a state, though any other data is contemplated. For example, the policy 242 may specify that when the state 240 identifies the computing device 202 as having the authority, a condition of the policy 242 may require that, for an actor to take authority from the computing device 202, a takeover message must be received and any role is suitable to take authority (e.g., any actor may take authority for any reason). However, the policy 242 may specify that when the state 240 identifies an actor other than the computing device 202 as having authority where the actor is not associated with a supervisor role, a condition of the policy 242 may require that, for a requesting actor to take authority from the engaged actor, a relinquish message, handover message, and/or escalation message must have been received from the engaged actor and/or the request must identify the requesting actor as being a supervisor. In some examples, when the vehicle holds the authority, actor(s) may be prevented from gaining authority at all and/or except for in narrowly-defined conditions (e.g., a safety-critical event is detected at the vehicle, the vehicle generates a teleoperations request). In some instances, the authority tracker 238 may verify an identity of a requesting actor before authorizing the actor to take the authority (e.g., via an open authorization (OAuth) exchange, by verifying a signed message using a public key, contacting a directory service, and the like). More examples of conditions that limit authority transitions are discussed below.

In some instances, the authority tracker 238 may transmit a state message 244, via network interface(s) 208 over network(s) 216, to the computing device(s) 212 periodically, based at least in part on receiving a control message 246, based upon another event, etc. The state message 244 may include at least a portion of the state 240 stored at memory 220.

In some instances, transmitting the state message 244 may comprise transmitting (broadcasting) the state message 244 over a state channel, which may comprise a publish-subscribe (pub/sub) service where computing device(s) 212 associated at least one actor is a subscriber. Similarly, the computing device(s) 212 may transmit a control message 246 over a control channel that comprises a pub/sub service where the computing device 202 may be a subscriber. Moreover, the computing device 202 and/or the computing device(s) 212 may subscribe to a user information channel to receive user information 248 from directory device(s) 214 associated with a directory service 250.

In some instances, the state 240 and/or a state message 244 may comprise at least one of an identifier of an engaged actor, an identifier of the computing device 202 and/or a component thereof (e.g., a vehicle number, a vehicle number and an identification of one of the component(s) 234 that is being provided guidance); a status (e.g., success, failure, timeout, awaiting handoff, escalating); and/or a second identifier (e.g., a role targeted by a handoff/escalation, an actor targeted by a handoff/escalation). In some instances, "success" may indicate that the authority tracker 238 authorized an actor to take authority and "failed" may indicate that the authority tracker 238 denied an actor from taking authority.

In some instances, the control message 246 may comprise a request regarding the authority. For example, the control message 246 may comprise an action such as a takeover message, a relinquish message, a handoff message, an escalation message, and/or a rejection message. In some instances, the message, whichever it may be, may further comprise a target vehicle identifier (e.g., an identifier that distinguishes the computing device 202 from other vehicles), a source/identity identifier (e.g., a username associated an actor whose host machine sends the control message 246), and/or a second identifier (e.g., to identify another actor and/or role, such as in a handoff and/or escalation message). In some instances, a source/identity identifier may comprise a username (e.g., a username that is unique across the system and that matches a directory record 252), a host name (e.g., an identification of a specific computing device used by an actor, such as a media access control (MAC) address and/or an Internet protocol (IP) address), a process identifier and/or process name that identifies a guidance application 254 running on the computing device(s) 212, and/or a hash of any portion of the above-described data. A unique identifier may be associated with each actor known to the system (and as recorded in the directory records 252).

The takeover message may indicate that the actor sending the takeover message is requesting that the authority tracker 238 transition authority from an engaged actor to the requesting actor. In some instances, the takeover message may function as an acceptance to a request for teleoperator support, a handoff message, an escalation message, etc.

The relinquish message may indicate that an actor that currently has authority (the "engaged actor") is giving up the authority, causing authority to revert to a former holder of authority (who may be identified by the second identifier), a default holder of authority (e.g. the computing device 202), to the computing device 202, and/or to any currently waiting requesting actors.

The handoff message may indicate that the engaged actor requests to transfer authority to a different actor. In some instances, a handoff message may comprise second identifier of a specific actor to which the engaged actor requests to transfer authority or the second identifier may identify a role to which the engaged actor requests to transfer authority (e.g., any "peer" actors—actors having a same role as the engaged actor, any online actors). In some instances, the engaged actor may retain authority until a takeover message is received by the specific actor identified by the handoff message and/or an actor associated with a role identified by the handoff message (e.g., a takeover message is received by a peer actor). In some examples, requiring both a handoff and takeover ensures that the actor associated with the handoff is ready, willing, and able to provide the required guidance to the vehicle. In some instances, this process of requesting to transfer authority may result in a delay until the authority is actually transferred. In some instances, when the authority tracker receives a handoff message, the authority tracker may modify the state 240 to reflect the identifier of the recipient actor, an identification of the specified role, and/or "awaiting handoff."

The escalation message may indicate that an engaged actor requests to transfer authority to a supervising actor (e.g., an actor associated with a role of "supervisor" in the directory records 252). Again, in some instances, this may comprise an identifier of a specific actor associated with a supervising role and/or this may comprise indicating a supervising role. In some instances, the engaged actor may retain authority until a takeover message is received by the specific supervising actor identified by the escalation message and/or an actor associated with a role identified by the escalation message (e.g., a supervisor role). In some instances, when the authority tracker receives an escalation message, the authority tracker may modify the state 240 to reflect the identifier of the recipient supervising actor, an identification of the specified role, and/or "escalating."

For example, an engaged actor may generate an escalation message when the engaged actor is unable to resolve an issue, the policy specifies that the engaged actor doesn't have the privileges to send a type of guidance to the vehicle and/or to view sensor data from the vehicle, and/or the engaged actor is not associated with a type of component of the vehicle (e.g., the engaged actor was handling a trajectory issue when a passenger ride issue arose, which the engaged actor may not have authorization and/or an application to handle).

In some instances, the guidance application 254 may cause the computing device(s) 212 to display a user interface for receiving input from an actor. Based on the input, the computing device(s) 212 may generate guidance comprising computer-executable instructions and/or logic, which may be transmitted via the network interface(s) 226 to the computing device 202. In some instances, the user interface may comprise selectable elements that, upon input of an actor, generate and/or transmit a control message 246. In some instances, the guidance application 254 may not populate the user interface with options to transmit guidance to the autonomous vehicle, may not present the selectable elements, and/or may not otherwise allow an actor to cause the computing device(s) 212 to generate guidance to transmit to the autonomous vehicle until a state message 244 broadcast from the computing device 202 indicates that the actor has authority.

In some instances, a state message 244 may comprise an identifier associated with the actor and/or a host machine identifier. Therefore, the computing device(s) 212 may receive a state message 244 via the network interface(s) 226 and guidance application 254 may determine that the host machine and/or the actor are identified in the state message 244. In response, the guidance application 254 may populate the user interface with the selectable elements and/or otherwise allow generation and/or transmission of guidance from the computing device(s) 212 to the computing device 202. In some instances, the guidance application 254 may retrieve a vehicle identifier from the state message 244 to populate control message(s) 246 and/or to associate with guidance transmitted to the computing device 202.

In some instances, an actor may log into the computing device(s) 212 with a username recorded in the directory records 252 and, upon successfully logging in, the computing device(s) 212 may periodically transmit an "online" signal indicating that the actor is online to one or more other devices on the network(s) 216. For example, where computing device(s) 212 comprise multiple devices associated with multiple actors, the computing device(s) 212 may transmit the online signal to the other devices. The computing device(s) 212 may additionally, or alternatively, store in memory 230 a record of active user(s) 256 based at least in part on online signals received from other devices.

In some instances, the computing device(s) 212 may store, in associated with the active user(s) 256 user information 248 received from the directory device(s) 214. For example, a first actor may be operating a first computing device 212 and the first computing device 212 may receive a notification that a second actor is logged into a second computing device 212. The first computing device 212 may access the user information 248 stored in memory 230, request user information 248 from the directory device(s) 214, and/or otherwise obtain the user information 248. In some instances, the first computing device 212 may store an indication that the second actor is online in the record of active user(s) 256 and/or a role associated with the second actor (e.g., identified from the user information 248).

In some instances, computing device(s) 212 may transmit additional signals to other computing device(s) 212 indicating activity at the computing device(s) 212. For example, an online signal may additionally, or alternatively, indicate that the actor is online, but not an engaged actor (e.g., the actor has not received a notification for teleoperation support from a vehicle, the actor is not actively providing teleoperation support to a vehicle, the state channel does not include any state messages indicating that the actor has authority); online signal may additionally, or alternatively, indicate that the actor is online but is engaged (e.g., a state message indicates that the actor is the engaged actor for computing device 202, the guidance application 254 makes this indication), etc. In some instances, the computing device(s) 212 may receive the signals and store indications associated with the signals in the record of active user(s) 256.

The guidance application 254 may determine a subset of the active user(s) 256 (e.g., online users that are not occupied, online users that are associated with a role "supervisor") and the guidance application 254 may use this subset to populate a user interface and/or to determine a second device to which to transmit a request for teleoperation support received from the computing device 202, a handoff message, and/or an escalation message. For example, an engaged actor may request to transition authority to a supervisor actor (e.g., an actor associated with the role "supervisor" in the directory records 252). The guidance application 254 may cause the user interface to display a selectable element that, upon receiving input from an actor, causes the user interface to display an element that identifies supervisors that are online and/or that transmits an escalation message to the device(s) of one or more of the subset of the active user(s) 256 that are online and that are associated with the role "supervisor."

In some instances, the directory service 250 may comprise an open authorization (OAuth) application, a data distribution service (DDS) system, and/or an active directory server. The directory service 250 may provide user information 248 to the computing device 202 and/or computing device(s) 212 and/or may verify an identifier associated with a control message 246. For example, upon receiving a control message 246, the authority tracker 238 may transmit a verification request to the directory service 250 to ensure that an identifier associated with the control message 246 corresponds to an actor registered in the directory records 252 and/or that the identifier is associated with a role necessary for authority to transition to the actor (e.g., the control message 246 specifies an action, such as escalation, that requires that the actor be associated with a "supervisor" role). The directory service 250 may provide up-to-date information on role changes and/or authorized users, may track which users are online, and/or may store and push configuration data such as a keep-alive message interval, a timeout period, vehicle-specific settings, etc. In additional or alternate examples, the directory service 250 may associate a geographical area with an actor, such that the actor is only able to control vehicles in the geographical area, and/or Internal protocol (IP) address restrictions that only allow certain IP address(es) and/or IP address ranges and/or subnets to be verified by the directory service 250. In some instances, a vehicle may be hard-coded to only respond to a range of IP addresses and/or actor(s) associated with a geographical area. The directory service 250 may issue public key/private key pairs and/or certificate(s) to an actor and/or to a vehicle for the vehicle to verify the identity of an actor. In some instances, the directory service 250 and/or the directory records 252 may be stored in memory 230. For example, guidance application 254 may use directory service 250 to cryptographically sign the control message 246 with a certificate associated with an actor (which may be included in the user information 248) and the authority tracker 238 may verify the signature (using the certificate received in the user information 248) and/or associate the control message 246 with a username before determining whether to authorize an action specified by the control message 246.

In some instances, aspects of some or all of the components discussed herein may include any models, algorithms, and/or machine learning algorithms.

It should be noted that while FIG. 2 is illustrated as a distributed system, in alternative examples, components of the computing device 202 may be associated with the computing device(s) 212 and/or 214 and/or components of the computing device(s) 212 and/or 214 may be associated with the computing device 202 and/or each other. That is, the computing device 202 may perform one or more of the functions associated with the computing device(s) 212 and/or 214, and vice versa.

Example Process

Figure 3:
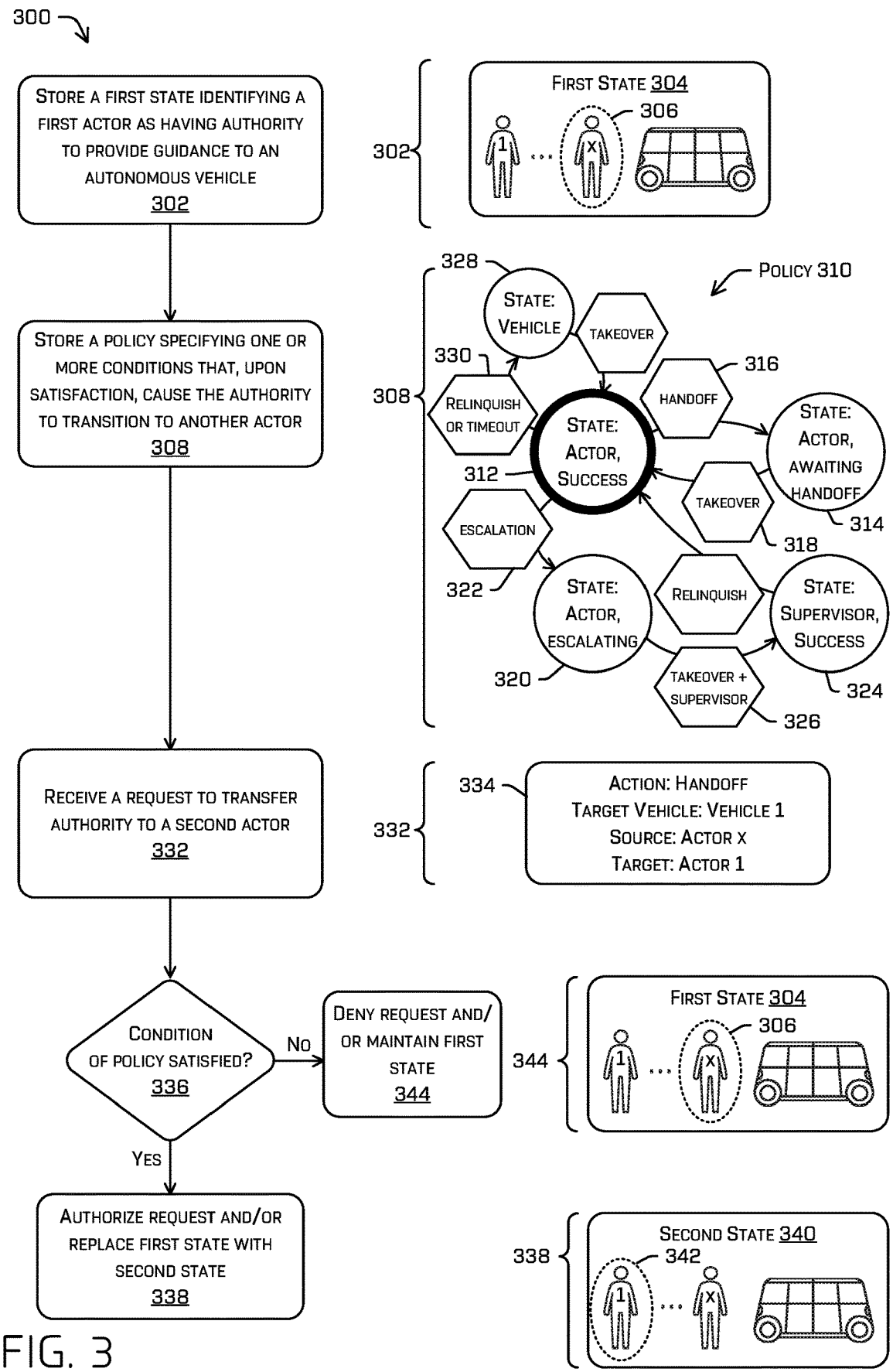
FIG. 3 illustrates a pictorial flow diagram of an example process for granting authority to an actor, transitioning authority between actors, and/or tracking which actor has authority.

FIG. 3 illustrates a pictorial flow diagram of an example process 300 for granting authority to an actor, transitioning authority between actors, and/or tracking which actor has authority. Example process 300 may be performed by computing device(s) such as vehicle computing device(s) 204 and/or computing device(s) 214.

At operation 302, example process 300 may include storing a first state 304 identifying (306) a first actor (e.g., human "x" in the diagram and/or a computing device associated therewith) as having authority to provide guidance to an autonomous vehicle, according to any of the techniques discussed herein. In some instances, this may comprise storing the first state 304 in a memory at an autonomous vehicle. The autonomous vehicle may periodically and/or upon request provide at least part of the first state 304 as a state message broadcast over the state channel.

At operation 308, example process 300 may include storing a policy specifying one or more conditions that, upon satisfaction of one or more conditions, may cause the authority to transition to another actor other than the first actor, according to any of the techniques discussed herein. FIG. 3 depicts a representation of an example policy 310, which may comprise a state machine. The example policy 310 depicts states as circles, transitions as arrows, and conditions as hexagons. The bolded state of the policy indicates an example of a current state 312 associated with first state 304. Example policy 310 is non-limiting and has been simplified for the sake of clarity. In some instances, one condition may be associated with one transition and there may be more than one transition associated with each state.

For example, in the example policy 310, the current state 312 identifies the engaged actor as being an actor other than the vehicle and that the transition to this engaged actor was successful based on a previously received request from the engaged actor (i.e., identified as "actor, success" in the figure for simplicity). The current state 312 may transition to an "actor, awaiting handoff" state 314 if a handoff message 316 is received from the engaged actor, which may be a condition of that transition. Once in state 314, state 314 may transition back to state 312 if a takeover message 318 is received from an actor identified in the handoff message 316. Note that, if this were to happen, upon reverting to state 312, the state would replace an identifier of the formerly engaged actor with an identifier of the newly engaged actor, which is not depicted for clarity.

Alternatively, the current state 312 may transition to an "actor, escalating" state 320 if an escalation message 322 is received from the engaged actor, and the state may transition from an "actor, escalating" state 320 to a "supervisor, success" state 324 if a takeover message is received from an actor associated with the role "supervisor" (326). As described in more detail below, an "actor, escalating" state 320 may be associated with a search for one or more supervisor(s) that are online and/or otherwise available (and/or that are associated with the engaged actor), based at least in part on data available at a director service. In some examples, the handoff message 316 may be associated with a search for actor(s) that have a same role and/or privileges as the engaged actor.

Alternatively, the current state may revert back to a default state specifying the vehicle as having the authority (328) if a relinquish message is received from the engaged actor (330). Note that, for the sake of clarity, policy 310 is merely an example policy and all possible connections are not shown. For example, when a supervisor relinquishes authority, it may revert to a previous actor or to the vehicle. Moreover, in some instances, a supervisor may take authority from actor(s) with which the supervisor is associated and authority may transition to that supervisor without a previous escalation message having been received. In other words, in some instances, a supervisor may be able to take authority from actor(s) that they supervise, at any time, when one of those actor(s) currently has authority. This may provide a backup for incapacitated, aberrant, or otherwise undesirable actor behavior.

In some instances, more permutations of states, transitions, and/or conditions may be included in the policy 310 and the actual states, transitions, and/or condition may vary in practice. A condition may specify at least one of a role, a state (e.g., an origin state and/or a destination state), an action specified by a control message (e.g., a takeover message, a handoff message), a verification policy (e.g., an identity of the requesting actor must be authenticated by the directory service), etc.

At operation 332, example process 300 may include receiving a request to transfer the authority to a second actor, according to any of the techniques discussed herein. For example, the request may comprise a control message. FIG. 3 depicts a representation of an example control message 334 that includes an action comprising a handoff message, a target vehicle identifier, a source identifier, and a target identifier. This example control message 334 may convey that Actor "x" requests to transition to Actor "1" authority to provide guidance to "Vehicle 1."

At operation 336, example process 300 may include determining whether a condition of the policy is satisfied and/or whether to authorize or deny the request, according to any of the techniques discussed herein. Operation 336 may comprise determining a current state (e.g., retrieving the currently stored state from memory) and identifying, from the policy, one or more conditions associated with the state. In the depicted example, this may include determining that the current state is state 312 and that conditions 316, 322, and 330 are associated with the state (e.g., those are all the conditions associated with transitions away from the current state 312 given in the example so any transition allowed by example policy 310 will have to satisfy one of those states for authority to transition). Determining whether a condition is satisfied may additionally or alternatively include determining whether a role associated with the request is associated with a sufficient privilege to issue the request and/or to give guidance of a certain type. For example, a supervisor role may be associated with a privilege to cause a door of the vehicle to open even while the vehicle is moving (e.g., if an emergency event is detected at the vehicle).

At operation 338, example process 300 may include determining to authorize the request based at least in part on the policy, according to any of the techniques discussed herein. In the depicted example, this may include determining that Actor 1 and/or Actor X are authenticated/verified by a directory service and/or that a handoff message is associated with a valid transition. Upon determining to authorize the request, operation 338 may further comprise storing a second state 340 identifying (342) the second actor as having authority. In some instances, the second state may replace the first state in the memory. Operation 338 may additionally, or alternatively, comprise transmitting the second state over a state channel instead of the first state.

Responsive to receiving authorization and/or the second state 340, a guidance application associated with the actor may permit the second actor to provide guidance to the autonomous vehicle. Additionally, or alternatively, responsive to storing the second state 340, the autonomous vehicle may generate a trajectory for controlling motion of the autonomous vehicle based at least in part on guidance received from the second actor.

At operation 344, example process 300 may include determining to deny the request based at least in part on the policy, according to any of the techniques discussed herein. For example, in the illustrated example, this may include determining that Actor 1 and/or Actor x are not authenticated/verified by a directory service and/or that a current state is not associated with a handoff message (e.g., the current state doesn't allow handoffs therefrom). Based on determining to deny the request, the first state 304 may remain unmodified in the memory in which it is stored, identifying (306) Actor x as having authority.

Example Authority Transition and/or Isolation

Figure 4A:
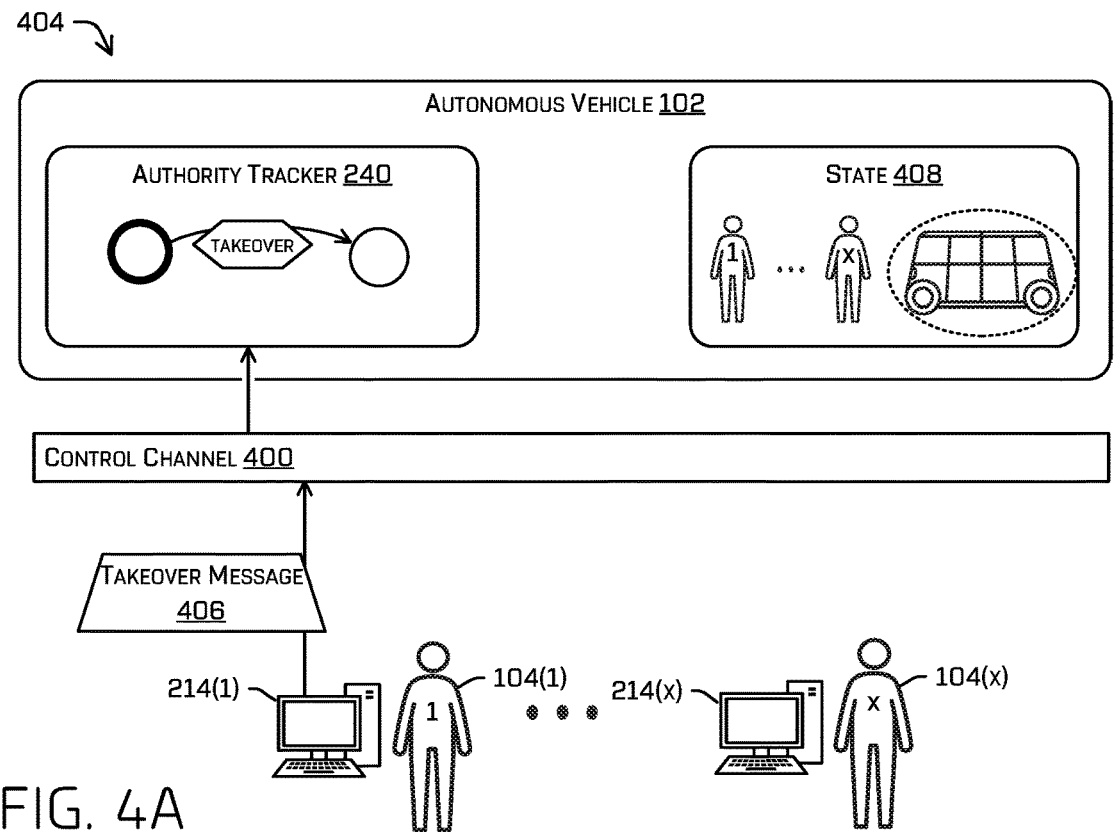
FIGS. 4A and 4B illustrate block diagrams of an example scenario in which an actor transmits a takeover message when the vehicle currently has authority.
Figure 4B:
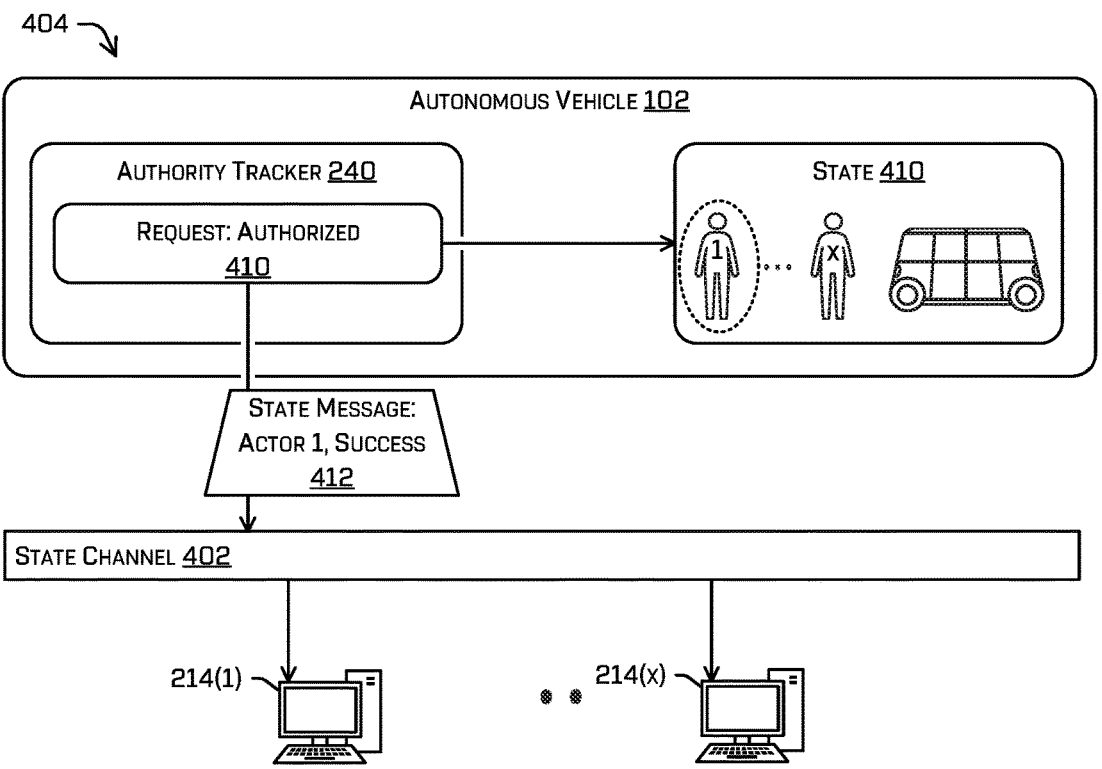
Figure 4C:
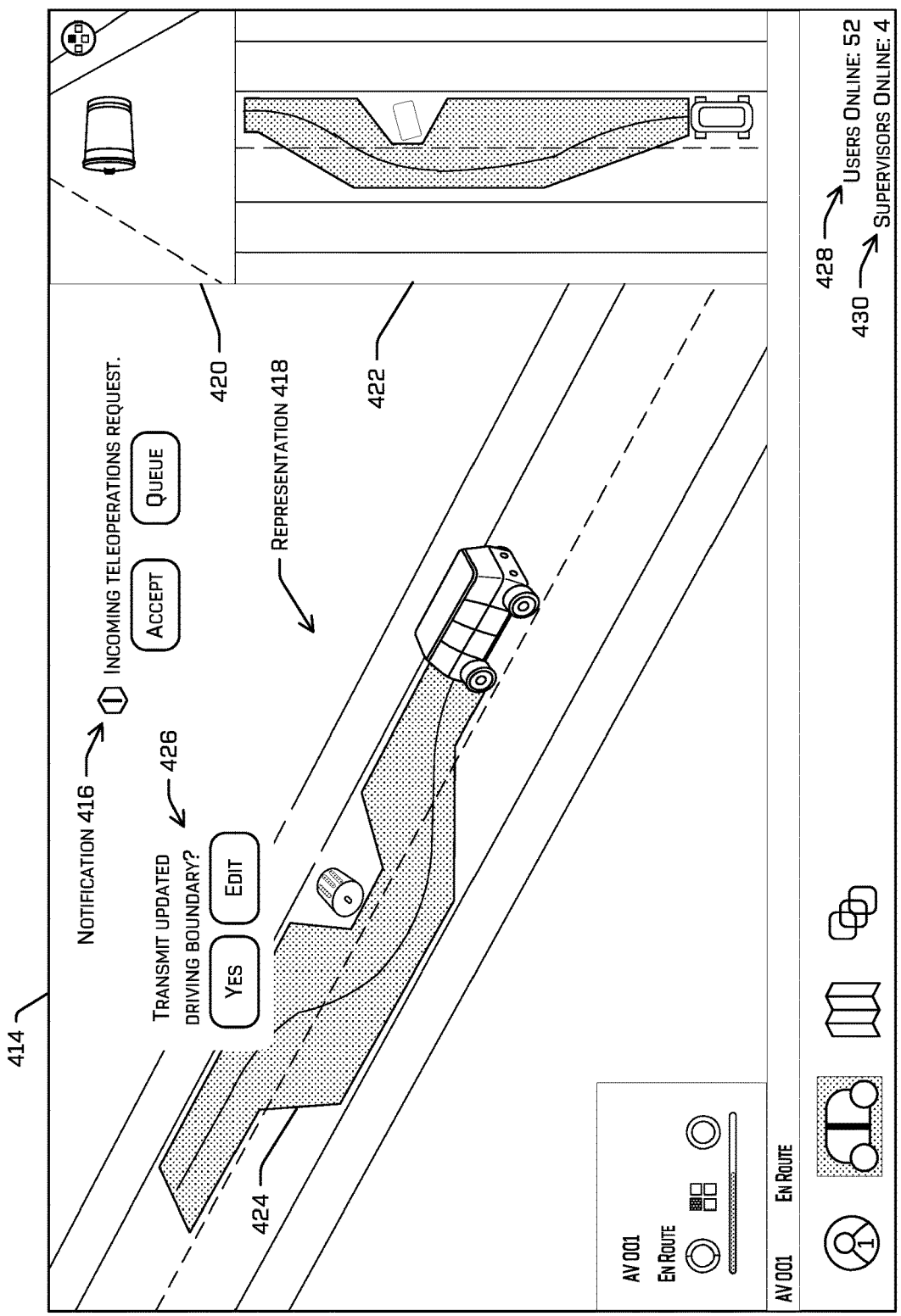
FIG. 4C illustrates an example user interface for providing guidance to an autonomous vehicle when authority has been granted.
Figure 6A:
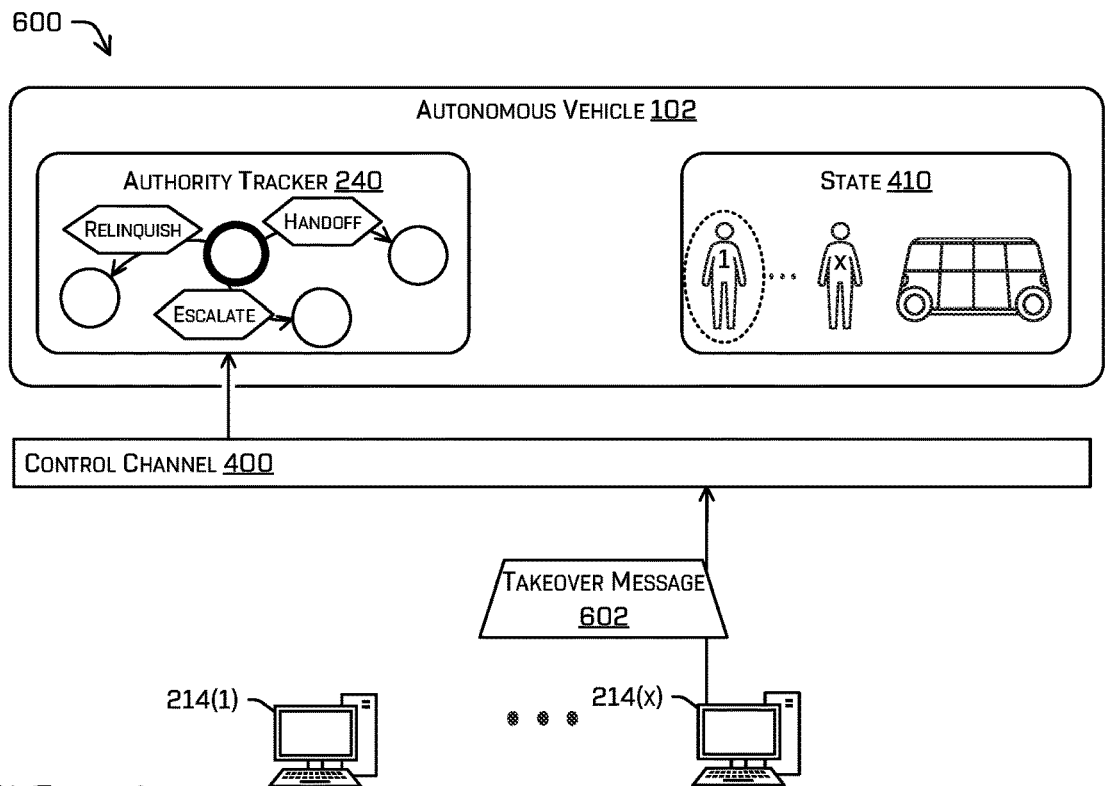
FIGS. 6A and 6B illustrate block diagrams of an example scenario in which an actor transmits a takeover message when another actor currently has authority.
Figure 6B:
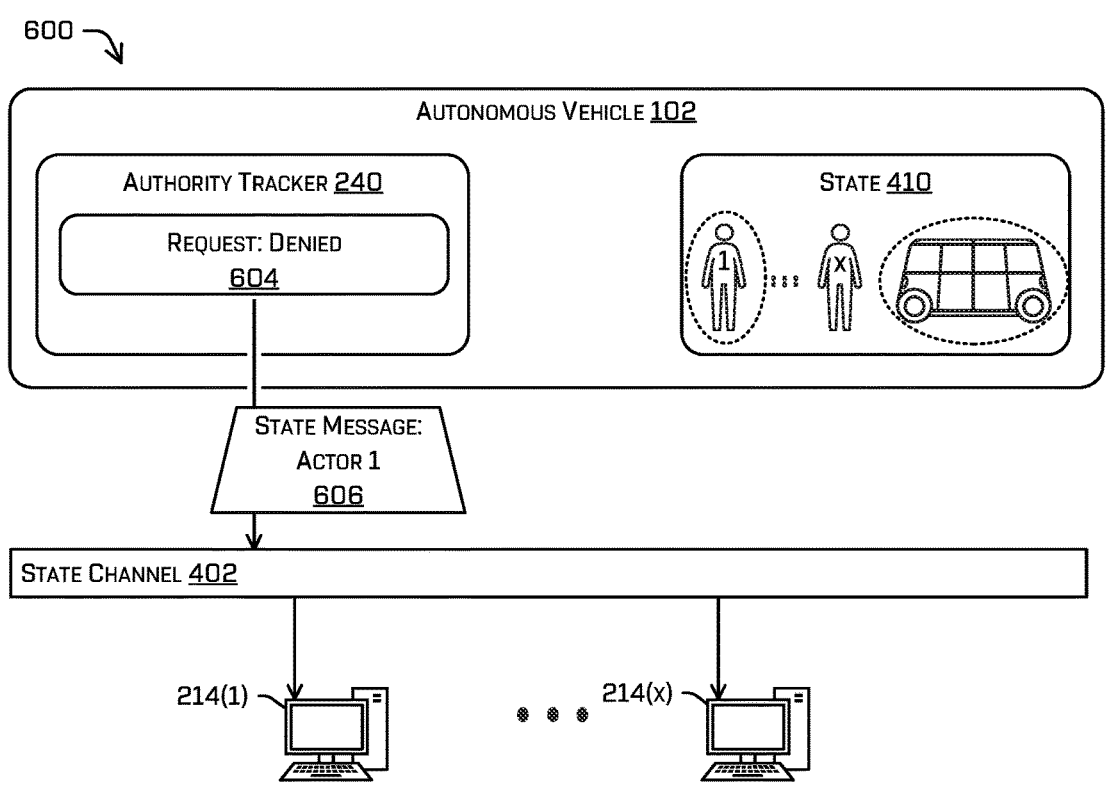
Figure 7A:
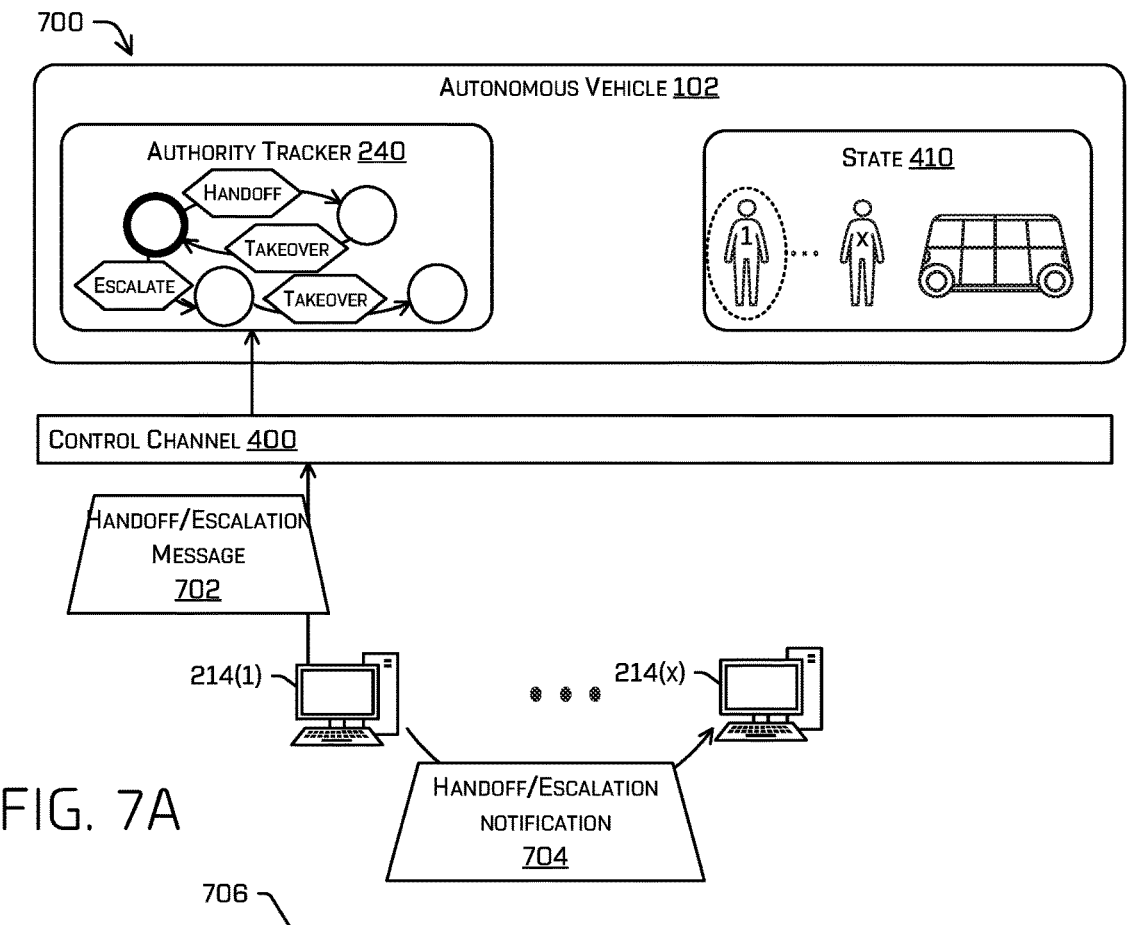
FIGS. 7A and 7D illustrate block diagrams of an example handover and/or escalation procedure.
Figure 7B:
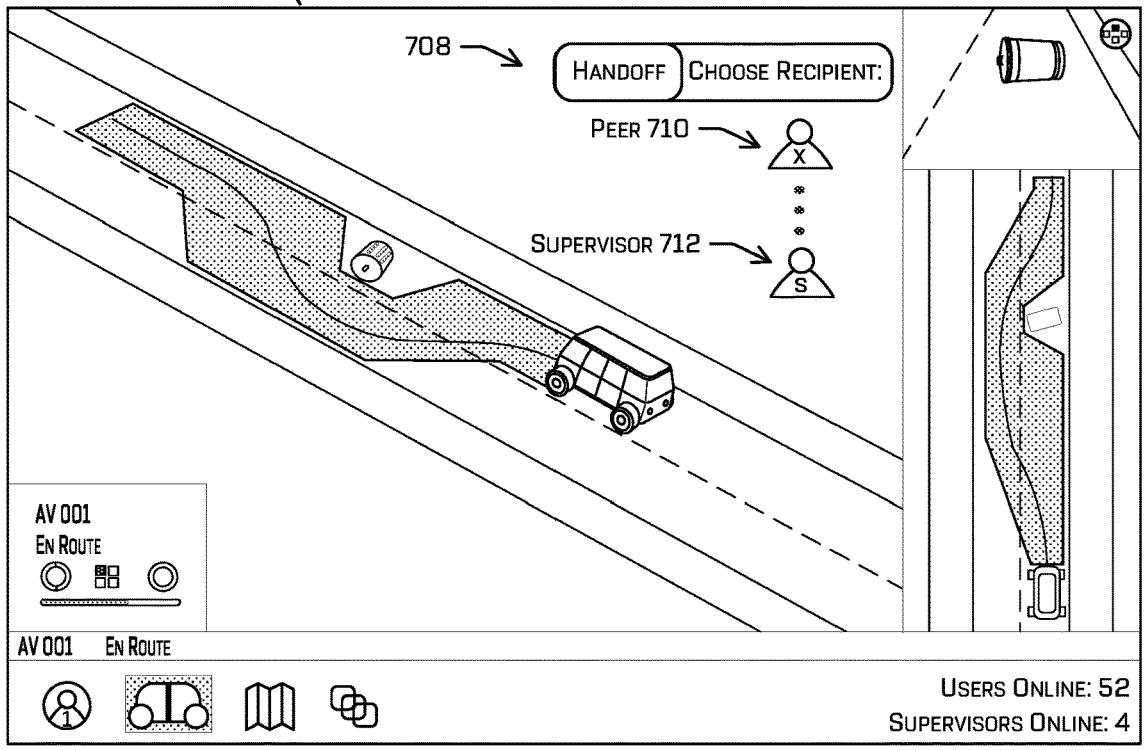
FIG. 7B illustrates an example user interface for causing a computing device to transmit a handover and/or escalation message.
Figure 7C:
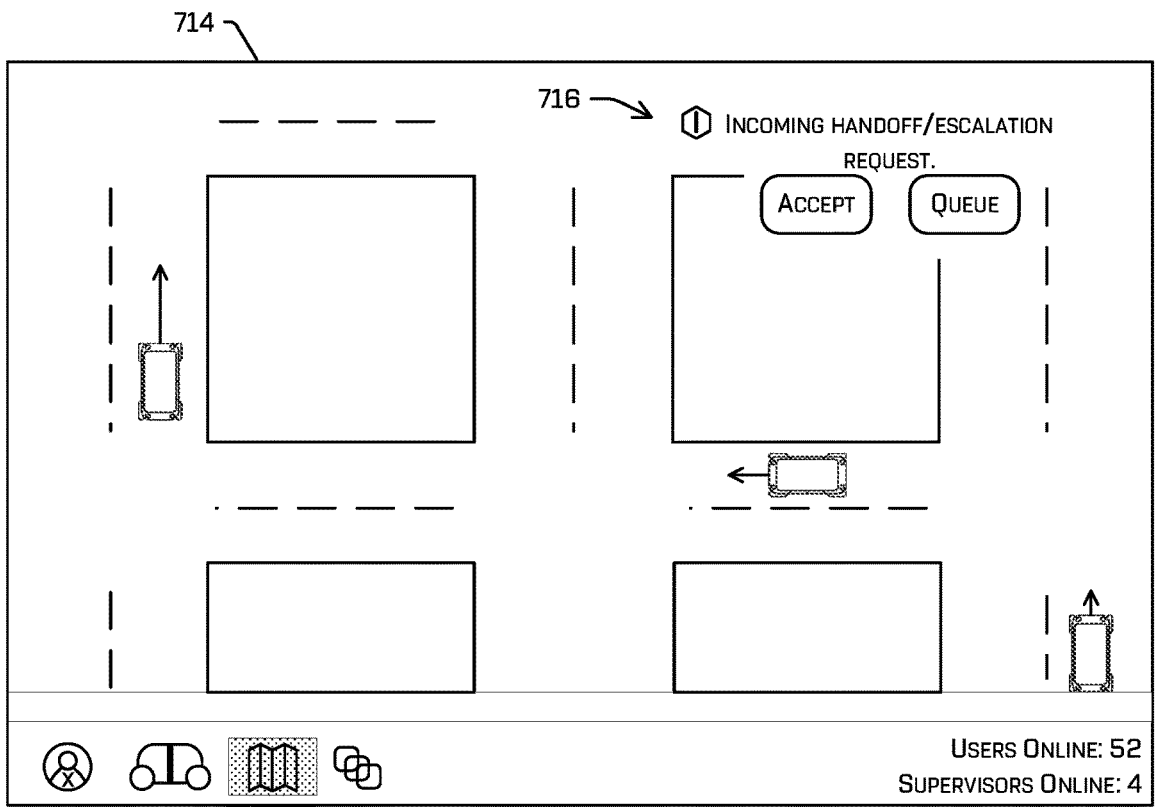
FIG. 7C illustrates an example user interface for causing a computing device to respond to a handover and/or escalation notification.
Figure 7D:
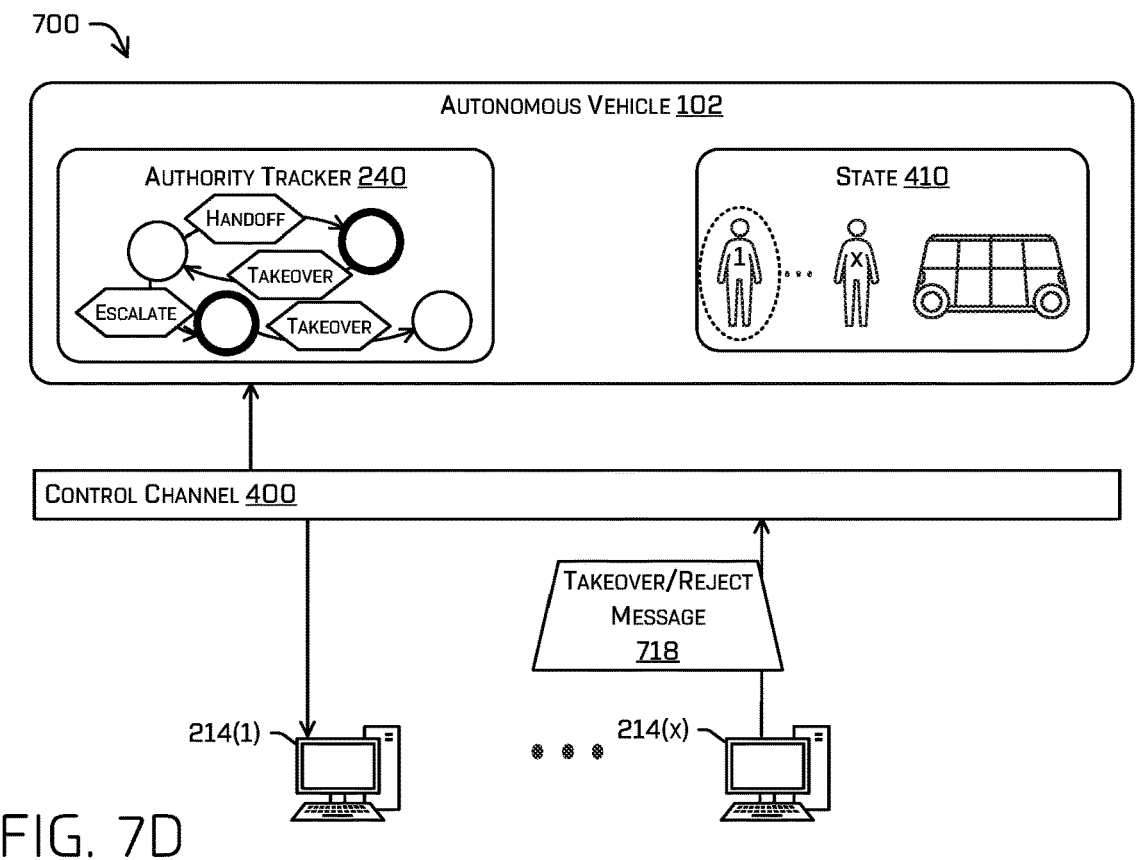

FIGS. 4A, 4B, 5A-7A, and 7D illustrate block diagrams of example scenarios in which various authority transitions and/or authority isolations may take place, while FIGS. 4C, 7B, and 7C illustrate example user interfaces that may be generated responsive to a computing device receiving a state message and/or that may cause generation and/or transmission of a control message. FIGS. 4A, 4B, 5A-7A, and 7D depict an autonomous vehicle 102 and actor(s) 214(1)-(x) and computing devices 214(1)-(x) associated therewith. Note that autonomous vehicle 102 may itself be an "actor" as well.

In some instances, a computing device (any one of 214(1)-(x)) may transmit a control message over a control channel 400 and any subscriber to the control channel 400 may receive the control message, according to a pub/sub configuration although any other method of transmitting messages from an actor device to the autonomous vehicle 102 are contemplated. In some instances, the autonomous vehicle 102 and/or an authority tracker 240 of the autonomous vehicle 102 may be a subscriber to the control channel 400 (as illustrated by the arrow emanating from the control channel 400 to the authority tracker 240). In some instances, the autonomous vehicle 102 may periodically, in response to a request received, and/or at any other time transmit a state message via a state channel 402 and any subscriber to the state channel 402 may receive the state message, according to a pub/sub configuration although any other method of transmitting messages from the autonomous vehicle 102 to computing device(s) 214(1)-(x) are contemplated. In some instances, computing device(s) 214(1)-(x) subscribe to the state channel 402 and thereby receive messages broadcasted over the state channel 402.

FIG. 4A depicts an example scenario 404 in which actor 104(1) transmits, over the control channel 400, a takeover message 406. In the example scenario 404, a state 408 stored at the autonomous vehicle 102 identifies the autonomous vehicle 102 as having authority. In some instances, based at least in part on receiving the takeover message 406, the authority tracker 240 may identify one or more conditions and transition(s) associated therewith in the policy based at least in part on the state 408. In some instances, the policy may allow any actor to takeover when the vehicle is identified as having authority. In other instances, the policy may require that, for an actor to be granted authority, the autonomous vehicle 102 must have previously transmitted a request for guidance. In additional or alternate examples, the policy may specify event(s), role(s), etc. for which an actor may be authorized to take authority. For example, a supervisor role may take authority at any point, vehicle(s) may be assigned to specific actor(s) and/or supervisor(s) such that only those actor(s) and/or supervisor(s) may take over unless all of the assigned actor(s) and supervisor(s) are occupied, actor(s) may be prevented from taking authority unless the vehicle detects a safety critical event and/or generates a teleoperations request, etc.

FIG. 4B depicts a continuation of example scenario 404. The authority tracker 240 may determine, based at least in part on the policy, to authorize (410) the takeover message. In some instances, the authority tracker 240 may determine that a condition associated with a transition in the policy has been satisfied by the takeover message 406. The authority tracker 240 may then cause state 408 to be updated to identify actor 104(1) as having authority to provide guidance to the autonomous vehicle 102. This update may include replacing state 408 with state 410 in a memory of the autonomous vehicle 102. Based at least in part on authorizing the takeover message 406, the authority tracker 240 may cause a state message 412 to be broadcast over the state channel 402 that includes at least part of the information stored in state 410. For example, state message 412 may identify actor 104(1) as having authority to provide guidance to the autonomous vehicle 102.

In some instances, based at least in part on receiving the state message 412 via the state channel 402, the computing device 214(1) may determine that the state message 412 identifies the actor 104(1) and/or the computing device 214(1) and, in response, may request and/or receive sensor data from the autonomous vehicle 102. Upon receiving the state message 412, the computing device 214(1) may begin to transmit keepalive messages to the autonomous vehicle 102 and the autonomous vehicle 102 may maintain the state 410 until a control message is received over the control channel 400 that causes authority to transition to another actor (e.g., a handover message is received followed by a takeover message by another actor, an escalation message is received followed by a takeover message by a supervisor, a relinquish message is received from actor 104(1)) or until the connection times out (e.g., the autonomous vehicle 102 determines that a keepalive message has not been received within a timeout period). If the connection times out, the authority tracker 240 may revert authority to a previous holder of authority and/or to a default holder of authority (e.g. the autonomous vehicle 102). In some instances, based at least in part on receiving the state message 412 computing device 214(1) may additionally, or alternatively, cause a user interface to be displayed by the computing device 214(1) and/or to cause components of the user interface to transition from being unselectable (e.g., grayed-out, not displayed) to being selectable. In an additional or alternate example, based at least in part on receiving the state message 412, the computing device 214(1) may instantiate a process on the computing device 214(1). This process may allow an actor to provide guidance to an autonomous vehicle and may cause a user interface to be displayed by a display associated with the computing device 214(1).

FIG. 4C depicts an example user interface 414 that the computing device 214(1) may generate and cause to be displayed, based at least in part on receiving the state message 412. In some instances, the computing device 214(1) may have caused the user interface 414 to display notification 416 based at least in part on receiving a request for guidance from the autonomous vehicle 102. Notification 416 may have comprised two selectable elements, "Accept" and/or "Queue." In some instances, input to the computing device 214(1) corresponding to the selectable element "Accept" may have caused the computing device 214(1) to transmit the takeover message 406 over the control channel 400. Input corresponding to the selectable element "Queue" may cause the computing device 214(1) to take no action regarding the request for guidance or may cause the computing device 214(1) to transmit the request for guidance to another computing device associated with an actor that is online. However, notification 416 may be displayed contemporaneously and/or before sensor data is received from the vehicle 102 for causing display of at least part of the user interface 414.

Actor 104(1) may use the user interface 414 to provide input to the computing device 214(1) that the computing device 214(1) translates into guidance, which may comprise computer-executable instructions and/or logic comprising a command, collaborative instruction, and/or a confirmation that may be used as guidance by the autonomous vehicle 102. For example, the example user interface 414 may comprise a birds-eye representation 418 of sensor data and/or guidance, a camera feed 420 (e.g., an image, a video), and/or a top-down representation 422 of the sensor data and/or guidance. In the depicted example user interface 414, the guidance comprises a modified driving boundary 424. In some examples, the actor may have provided input sufficient to create the shape of the modified driving boundary 424. The modified driving boundary 424 is an example of a collaborative instruction and is not intended to limit the types of guidance that may be provided using user interface 414. Examples of additional or alternate guidance and/or teleoperations operations may be found in U.S. patent application Ser. Nos. 15/644,267, 15/644,310, 15/644,349, and 15/644,390 filed Jul. 7, 2017, which are incorporated herein in their entirety.

Upon receiving input corresponding to guidance, the guidance application may cause a confirmation and/or some other selectable element (426) to be displayed via user interface 414, the selection of which causes the guidance to be transmitted to the autonomous vehicle 102. In some instances, the guidance application may append to the guidance an identifier associated with the actor 104(1). The authority tracker 240 may transmit, to the appropriate component of the autonomous vehicle 102, the guidance received from the computing device 214(1) of the actor 104(1) based at least in part on determining that the identifier corresponds to state 410 (e.g., the state 410 includes the identifier, thereby indicating that actor 104(1) has authority to provide the guidance). For example, based at least in part on receiving instructions corresponding to the modified driving boundary 424, the authority tracker 240 may transmit the instructions corresponding to the modified driving boundary 424 to a planner of the autonomous vehicle 102.

The planner may, in turn, generate a trajectory for the autonomous vehicle 102 that may cause the autonomous vehicle 102 to operate within the modified driving boundary 424.

In some examples, elements available via the user interface 414 may be further based at least in part on a role associated with an actor. For example, a supervisor role may be associated with a user interface that displays sensor data of a vehicle, even when that vehicle is being controlled by another actor, but that may have at least or all guidance controls made unavailable. In an additional or alternate example, the user interface associated with a supervisor may make unavailable guidance controls associated with a role of the engaged actor (e.g., drive boundary modification, trajectory confirmation, route modification), but may make available guidance controls associated with the role of supervisor but not associated with the role of the engaged actor (e.g., open a door while moving, stop vehicle on highway).

In some instances, based at least in part on a record of active user(s), the computing device 214(1) may additionally, or alternatively, cause the user interface 414 to display an indication of other actor(s) that are online (428) and/or supervisors (e.g., actors associated with the role supervisor) that are online (430). In some instances, the online actor(s) and/or supervisor(s) may be generally identified (e.g., by identifying a number of actor(s) and/or supervisor(s) that are online, as depicted in example user interface 414) and/or one or more of the online actor(s) and/or supervisor(s) may be specifically indicated (e.g., by username, by a picture or other representation of the actor). Input received at the computing device 214(1) that corresponds to 428 (whether selecting online users generally or selecting a specific user) may cause a handoff procedure to be initiated and/or input that corresponds to 430 (whether selecting online supervisors indicator generally, or selecting a specific supervisor) may cause an escalation procedure to be initiated.

Figure 5A:
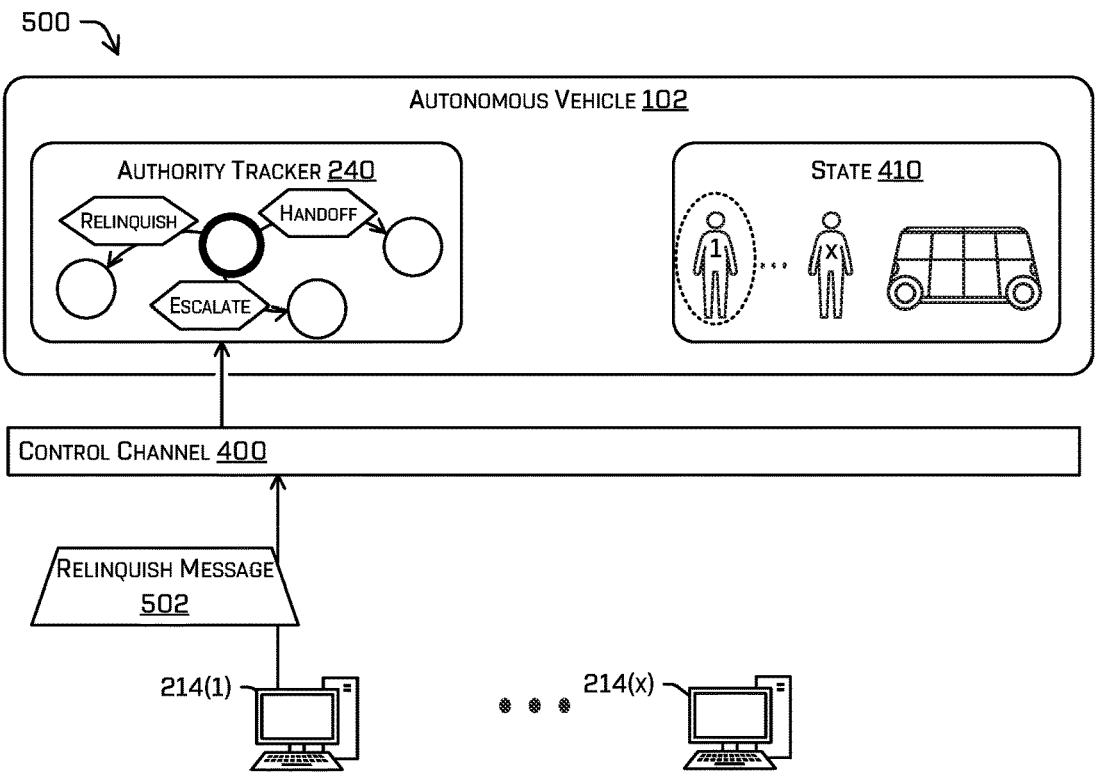
FIGS. 5A and 5B illustrate block diagrams of an example scenario in which an engaged actor transmits a relinquish message.

FIG. 5A depicts an example scenario 500 in which state 410 is still stored in memory, indicating that actor 104(1) has authority to provide guidance to the autonomous vehicle 102. In example scenario 500, actor 104(1) transmits, over the control channel 400, a relinquish message 502.

Figure 5B:
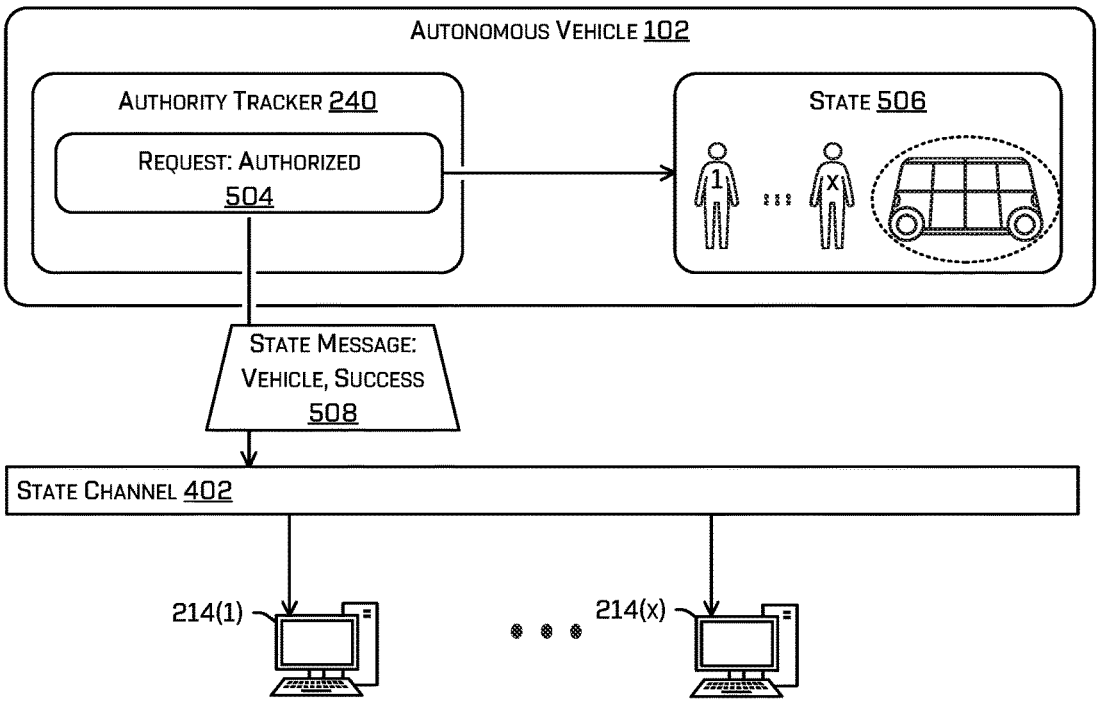

FIG. 5B depicts a continuation of example scenario 500. The authority tracker 240 may authorize 504 the relinquish message 502, based at least in part on determining that the relinquish message 502 satisfies a condition of the policy. The authority tracker 240 may cause the authority to transition by reverting to a previous authority holder and/or to revert to a default authority holder (e.g., autonomous vehicle 102). This may comprise storing a state 506 in a memory of the autonomous vehicle 102. State 506 may represent state 408, although state 506 may additionally indicate that the reversion was successful (e.g., "vehicle, success"). In some instances, the authority tracker 240 may transmit a state message 508 indicating the new authority holder (i.e., autonomous vehicle 102 in the depicted example) over the state channel 402. Any subscribers to the state channel 402 may receive the state message 508 (e.g., computing device(s) 214(1)-(*x*)). In some instances, upon receiving the state message 508, computing device 214(1) may terminate a process that allows actor 104(1) to provide guidance and/or may cause component(s) of a user interface to be unavailable for selection.

In some instances, after transmitting the relinquish message 502 the computing device 214(1) may keep a connection to the autonomous vehicle 102 open until the computing device 214(1) receives a state message indicating that a transition of authority has successfully occurred, even if this was due to a timeout. In some instances, the actor 104(1) may retain authority until the state message 508 is received by at least one of the computing device(s) 214(1)-(*x*) and/or until a timeout occurs (and the authority tracker 240 thereby causes an authority transition due to the timeout).

In cases where the current state indicates that a supervisor has authority and a relinquish message has been received, the authority tracker 240 may determine to revert authority to a default authority holder and/or to a previous authority holder (e.g., an actor that escalated authority to the supervisor).

FIG. 6A depicts an example scenario 600 in which state 410 is still stored in memory, indicating that actor 104(1) has authority to provide guidance to the autonomous vehicle 102. In example scenario 600, actor 104(*x*) transmits, over the control channel 400, a takeover message 602.

FIG. 6B depicts a continuation of example scenario 600. The authority tracker 240 may deny 604 the takeover message 602, based at least in part on determining that the takeover message 602 does not satisfy a condition of the policy. For example, the authority tracker 240 may determine to deny the takeover message 602 based at least in part on reading state 410 and determining that actor 104(1) currently has authority. Depending on the policy configuration, however, if the takeover message 602 identifies actor 104(*x*) as a supervisor, according to some policy configurations, the authority tracker 240 may authorize the takeover message 602 and transition the state 410 to a state identifying actor 104(*x*) as the authority holder. In other policy configurations, a takeover message is never authorized unless authority is being transitioned from a default authority holder or a message was received notifying the authority tracker 240 of a requested transition (e.g., a handover message, an escalation message).

In some instances, a supervisor may cause a takeover by transmitting from computing device 214(*x*) a request to computing device 214(1) that, upon acknowledgement and/or authorization of actor 104(1) (e.g., such as by providing input corresponding to a notification of the request displayed via the user interface of the guidance application), the computing device 214(1) may transmit an escalation message to the authority tracker 240 (over the control channel 400) and/or an acknowledgement message back to the computing device 214(*x*). The computing device 214(*x*) may, responsive to receiving the acknowledgement message or after a defined time period has passed, transmit the takeover message 602.

The authority tracker 240 may cause a state message 606 to be transmitted over the state channel 402 based at least in part on denying 604 the request and/or at a regular state transmission interval. The state message 606 may include at least part of state 410, thereby continuing to identify actor 104(1) as having authority. The state message 606 may be received by subscriber(s) to the state channel 402, including computing device 214(1) and/or computing device 214(*x*).

In some instances, based at least in part on receiving state message 606, computing device 214(*x*) may cause selectable elements for providing guidance via a user interface to remain unavailable. In some instances, computing device 214(*x*) may nonetheless cause sensor data received from the autonomous vehicle 102 to be displayed via the user interface, although in other cases, computing device 214(*x*) may prevent this.

FIG. 7A depicts an example scenario 700 in which state 410 is still stored in memory, indicating that actor 104(1) has authority to provide guidance to the autonomous vehicle 102. In example scenario 700, actor 104(1) transmits, over the control channel 400, a handover message and/or escalation message 702. In some instances, a handover message and/or an escalation message may include both a source identifier (e.g., a username or other identifier of the originating actor) and a target identifier (e.g., an identifier of a specific actor and/or a role to which authority is requested to transition). The target identifier may include, for example, a username of a specific actor and/or a role.

In some instances, the computing device 214(1) may transmit a handover/escalation notification 704 substantially simultaneously or before transmitting the handover message and/or escalation message 702 to computing device(s) associated with the target identifier.

In some instances, the computing device 214(1) may generate and/or transmit handover message and/or escalation message 702 without receiving user input. For example, if input is not received at the computing device 214(1) within a time period of having received a state message identifying the actor 104(1) as having authority, the computing device 214(1) may generate and/or transmit a handover message identifying, as a target, a peer of the actor 104(1) (e.g., another actor having a same role as the actor 104(1)), a same role as the actor 104(1), etc., and/or an escalation message 702.

In some instances, the computing device 214(1) may auto-populate the target identifier with identifier(s) associated with one or more online actors (for handoffs) or supervisors (for escalations) and/or a predetermined number thereof.

FIG. 7B depicts an example user interface 706 for generating and/or transmitting a handoff message and/or escalation message. The example user interface 706 may comprise a selectable element 708 ("Handover") to initiate a handover. It is understood that this element may be substituted for an element that similarly initiates an escalation. Responsive to receiving input at the computing device 214(1) that corresponds to selectable element 708, the guidance application may identify at least a subset of actors that are online and, in the case of escalations, that are associated with the role of supervisor. In some instances, the computing device 214(1) may cause the user interface 706 to display a list of selectable elements corresponding to peer(s) 710 (in the case of a handoff) and/or supervisor(s) 712 (in the case of an escalation) that correspond to the subset of actors identified by the guidance application. Input corresponding to one or more of the selectable elements 710 and/or 712 may cause the computing device 214(1) to transmit the handover message and/or escalation message 702 comprising a target identifier that identifies the actor(s) selected. The computing device 214(1) may additionally transmit handover/escalation notification 704 to computing device(s) associated with the actor(s) identified by the target identifier of the handover message and/or escalation message 702.

In an additional or alternate example, responsive to receiving input at the computing device 214(1) that corresponds to selectable element 708, the guidance application may identify at least a subset of actors that are online and, in the case of escalations, that are associated with the role of supervisor, and the guidance application may automatically cause a handover message and/or escalation message 702 and/or handover/escalation notification 704 to be transmitted without further input of an actor. For example, the guidance application may auto-populate the target identifier of handover message and/or escalation message 702 with identifier(s) associated with one or more online actors (for handoffs) or supervisors (for escalations) and/or a predetermined number thereof. In some instances, the guidance application may identify supervisor(s) that are associated with actor 104(1) and, if supervisor(s) associated with actor 104(1) are not indicated as being available, the guidance application may expand a search for an available supervisors to supervisor(s) that are not associated with the actor 104(1).

FIG. 7C depicts an example user interface 714 caused to be displayed by a computing device that receives handover/escalation notification 704. The example user interface 714 may cause a notification 716 to be displayed over at least a portion of an existing display (e.g., the birds-eye view of a representation of a fleet of autonomous vehicles operating in a city). In some instances, the notification 716 may comprise selectable elements (e.g., indicated by "Accept" and "Queue" in the example user interface 714). Input received at the computing device indicating an acceptance of the request to handover and/or escalate authority may cause the computing device to transmit a takeover message 718 over control channel 400 (depicted in FIG. 7D). Responsive to receiving the takeover message 718, the authority tracker 240 may transition authority to an actor associated with the computing device. In response to transmitting the takeover message 718 and/or in response to receiving un updated state message, the computing device may instantiate a process and/or make components of a user interface available for selection. Input received at the computing device indicating a queue of the request may transmit the computing device to transmit a rejection message over the control channel 400 and/or may allow a user to select another actor to which to transmit the request and/or may transmit the request to additional actor(s). Responsive to receiving the takeover message 718, the authority tracker 240 may transition the state to identify a "failure" and to continue to identify actor 104(1) as having authority or, in some instances, revert authority to a default authority holder.

In examples where the target identifier identifies multiple actors, the authority tracker may transition authority to an actor associated with a takeover message that is received first and, if a rejection message is received, may maintain a "awaiting handoff" or "escalating" state until a transition occurs or until rejections are received from all the actors identified by the target identifier.

Example Clauses

A. An autonomous vehicle comprising: one or more processors; a network interface; and a memory storing instructions executable by the one or more processors, wherein the instructions, when executed, cause the autonomous vehicle to: store a first state identifying a computing device of the autonomous vehicle as having authority to provide guidance to a component of the autonomous vehicle; store a policy specifying one or more conditions associated with transferring authority to an actor, the one or more conditions comprising at least one of an action, a role, or a state; receive, via the network interface and from a first device associated with a first actor, a request to transfer authority to the first actor, the request including at least one of an identifier specifying an identity or a first role of the first actor; update, based at least in part on determining that the at least one of the identity or the role satisfy a condition specified by the policy stored in the memory, the first state to a second state identifying the first actor as having authority; and transmit, via the network interface and to at least the first device, the second state; and control, based at least in part on guidance received from the first device via the network interface and determining that the guidance corresponds with the role, a component of the autonomous vehicle.

B. The autonomous vehicle as paragraph A recites, wherein: determining that at least one of the identity or the role satisfy the condition comprises evaluating a state machine; and the condition defines at least one of the action, the role, or the state for which authority is to be transitioned between different actors, wherein the action comprises at least one of a takeover by a different actor, a handoff from a current actor that has authority to a different actor, or an escalation from the current actor to an actor associated with a supervisor role; wherein the role comprises at least one of a teleoperator, a ride operator, a supervisor, or a super user; and wherein the state identifies at least one of a current actor that has authority or a pending action.

C. The autonomous vehicle as either paragraph A or B recites, wherein: the guidance comprises at least one of a confirmation, a collaborative instruction, or a command; and controlling the component comprises at least one of: generating a trajectory for controlling motion of the autonomous vehicle; controlling an emitter of the autonomous vehicle; or modifying an interior condition of the vehicle.

D. The autonomous vehicle as any one of paragraphs A-C recites, wherein the instructions further cause the autonomous vehicle to: receive, via the network interface and from a second actor, guidance; determine, based at least in part on evaluating a state machine, that a second condition associated with the second state is not satisfied based at least in part on determining that at least one of a role associated with the second actor is not associated with a sufficient privilege associated with the guidance, the guidance is not associated with a second action associated with the second condition, or the second state does not identify the second actor; and maintain the second state, based at least in part on determining that the second condition is not satisfied.

E. The autonomous vehicle as any one of paragraphs A-D recites, wherein the instructions further cause the autonomous vehicle to: receive, via the network interface and from the first actor, at least one of a relinquish message, a handoff message, or an escalation message; receive, via the network interface, a second request to transfer to a second actor the authority to provide guidance; and update, based at least in part on determining that a second condition specified by the policy stored in the memory is satisfied and the at least one of the relinquish message, the handoff message, or the escalation message, the second state to a third state identifying the second actor as having authority.

F. The autonomous vehicle as any one of paragraphs A-E recites, wherein: the second request comprises a takeover message associated with the escalation message; and determining that the second condition is satisfied is based at least in part on determining that a second role associated with the second request indicates that the second actor is a supervisor.

G. The autonomous vehicle as any one of paragraphs A-F recites, wherein the instructions further cause the autonomous vehicle to: receive, via the network interface, a second request to transfer to a second actor authority to provide guidance; and determine to reject the second request, based at least in part on determining that the second request is an invalid transfer according to the policy based at least in part on determining that the second request does not satisfy a second condition of the policy associated with the second state, wherein determining that the second request does not satisfy the second condition is based at least in part on determining that at least one of: a handoff message, an escalation message, or relinquish message has not been received from the first actor, or a second role associated with the second actor does not include an identification of a supervisor role.

H. The autonomous vehicle as any one of paragraphs A-G recites, wherein the instructions further cause the autonomous vehicle to: replace the second state with the first state identifying the autonomous vehicle as having the authority based at least in part on at least one of: receiving, via the network interface and from the first device, a relinquish message, or determining that a time period has lapsed since a last keepalive message was received via the network interface from the first device.

I. A non-transitory computer-readable medium storing processor-executable instructions that, when executed by one or more processors, cause the one or more processors to: store a policy associating at least one of a state, a role, or an action; store a state identifying a default actor as having authority to provide guidance to an autonomous vehicle; transmit, via a network interface and to a first computing device associated with a first actor, the first state; receive, via the network interface and from the first device, a request to transfer authority to the first actor, the request specifying at least one of an identifier of the first actor, an action, or a role; update the state to identify the first actor as having the authority, based at least in part on at least one determining that the identifier is verified or determining that the action or the role satisfy a condition specified by the policy; transmit, via the network interface to the first device, the second state; and control a device associated with the non-transitory computer-readable medium based at least in part on receiving guidance via the network interface from the first computing device associated with the first actor and based at least in part on the state identifying the first actor as having the authority.

J. The non-transitory computer-readable medium as paragraph I recites, wherein: the action comprises at least one of a takeover by the first actor, a handoff from the default actor to the first actor, or an escalation from the default actor to the first actor; and the role comprises at least one of a teleoperator, a ride operator, a supervisor, or a super user.

K. The non-transitory computer-readable medium as either paragraph I or J recites, wherein determining that the action or the role satisfy a condition specified by the policy comprises determining that a state machine transition valid, a valid transition comprising: a first transition from an actor to another actor when a handoff message is first received from the actor; a second transition from the actor to a supervisor when an escalation message is first received from the actor and a takeover message is received from the supervisor, the supervisor being the second actor; a third transition from the actor to the supervisor when an emergency event indicator is first received, the supervisor being the second actor; a fourth transition from the actor to the supervisor when a computing device associated with the actor is inactive; a fifth transition from the actor to the supervisor when the supervisor overrides the policy based at least in part on indicating aberrant behavior at the computing device associated with the actor; a sixth transition from the actor to another based at least in part on determining that a keepalive message has not been received within a period of time; or a seventh transition from the actor to a device when a relinquish message has been received from the actor.

L. The non-transitory computer-readable medium as any one of paragraphs I-K recites, wherein the instructions further cause the one or more processors to: receive, via the network interface and from the first computing device, at least one of a relinquish message, a handoff message, or an escalation message from the first computing device; receive, via the network interface, a second request to transfer authority to a second actor to provide guidance; update the state to identify the second actor as having authority to provide guidance based at least in part on determining that a second identifier, a second role, or a second associated with the second request are associated with a valid transition specified by a second condition of the policy based at least in part on the at least one of the relinquish message, the handoff message, or the escalation message.

M. The non-transitory computer-readable medium as any one of paragraphs I-L recites, wherein: the guidance comprises at least one of a confirmation, a collaborative instruction, or a command; and controlling the device comprises at least one of: generating a trajectory for controlling motion of the autonomous vehicle; controlling an emitter of the autonomous vehicle; or modifying an interior condition of the vehicle.

N. A method comprising: storing a first state identifying a first actor as having authority to provide guidance to an autonomous vehicle; storing a policy specifying one or more conditions associated with transferring authority between actors, the one or more conditions comprising at least one of an action, a role, or a state; receiving, via a network interface and from a second actor, a first request to transfer authority to the second actor and at least one of: updating the first state to identify the second actor as having the authority based at least in part on determining that a second action or a second role associated with the second request fulfills a first condition of the policy; or maintaining the first state to identify the first actor as having the authority based at least in part on determining that at least one of the second action or the second role do not fulfill at least part of the first condition.

O. The method as paragraph N recites, wherein the method further comprises: receiving, from a first computing device associated with the first actor, first guidance; receiving, from a second computing device associated with a second actor, second guidance; and determining to control a component of the autonomous vehicle based at least in part on determining that the first state identifies the second actor as having authority and based at least in part on determining that the second role is associated with a privilege associated with the component.

P. The method as either paragraph N or O recites, wherein updating the first state to identify the second actor as having the authority is based at least in part on at least one of: determining that an identifier associated with an identity of the second actor is authorized to take authority; determining that the second role associated with the second actor is specified by the first condition; determining that the second action is specified by the first condition; determining that the second actor and the first request are associated with at least one of a handoff message or an escalation message received from the first actor; or determining that a relinquish message was received from the first actor.

Q. The method as any one of paragraphs N-P recites, wherein the memory is associated with a first device and the method further comprises: transmitting, to one or more devices subscribing to publications of the first device over a state channel, the state.

R. The method as any one of paragraphs N-Q recites, wherein: updating the first state to identify the second actor is based at least in part on determining, by evaluating a state machine, that a transition from the first actor to the second actor is valid, wherein a valid transition comprises: a first transition from an actor to another actor when a handoff message is first received from the actor; a second transition from the actor to a supervisor when an escalation message is first received from the actor and a takeover message is received from the supervisor, the supervisor being the second actor; a third transition from the actor to the supervisor when an emergency event indicator is first received, the supervisor being the second actor; a fourth transition from the actor to the supervisor when a computing device associated with the actor is inactive; a fifth transition from the actor to the supervisor when the supervisor overrides the policy based at least in part on indicating aberrant behavior at the computing device associated with the actor; a sixth transition from the actor to another based at least in part on determining that a keepalive message has not been received within a period of time; or a seventh transition from the actor to a device when a relinquish message has been received from the actor.

S. The method as any one of paragraphs N-R recites, wherein updating the first state to identify the second actor as having the authority comprises storing at least one of an identifier associated with the second actor, the second role, or a status of a transition; and publishing, to one or more computing devices, the first state.

T. The method as any one of paragraphs N-S recites, wherein updating the first state to identify the second actor as having the authority further comprises determining that an identifier associated with the second actor is at least one of verified by a directory service or associated with a request for guidance generated by the autonomous vehicle.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. An autonomous vehicle comprising:
one or more processors; and
a memory storing instructions executable by the one or more processors, wherein the instructions, when executed, cause the autonomous vehicle to:
store a first state identifying a computing device of the autonomous vehicle as having authority to provide guidance to a component of the autonomous vehicle;
store a policy specifying one or more conditions associated with transferring authority to an actor, the one or more conditions comprising a first condition that requires that a teleoperations request be previously received from the autonomous vehicle and at least one of an action, a role, or a state;
receive, from a first device associated with a first actor, a first request to transfer authority to the first actor, the first request including at least one of an identifier specifying an identity or a first role of the first actor;
determine to deny the first request based at least in part on determining that the autonomous vehicle had not transmitted the teleoperations request;
transmit a teleoperations request;
receive a second request to transfer authority to the first actor;
update, based at least in part on determining that the teleoperations request was transmitted by the vehicle and the at least one of the identity or the role satisfy a condition specified by the policy stored in the memory, the first state to a second state identifying the first actor as having sole authority to provide guidance to the component of the autonomous vehicle;
transmit, to at least the first device, the second state;
receive guidance from the first device via a network interface of the autonomous vehicle; and
control, based at least in part on the guidance and determining that the guidance is authorized by the second state, the component of the autonomous vehicle.

2. The autonomous vehicle as claim 1 recites, wherein:
determining that at least one of the identity or the role satisfy the condition comprises evaluating a state machine; and
the condition defines at least one of the action, the role, or the state for which authority is to be transitioned between actors,
wherein the action comprises at least one of a takeover by a different actor, a handoff from a current actor that has authority to the different actor, or an escalation from the current actor to an actor associated with a supervisor role;

wherein the role comprises at least one of a teleoperator, a ride operator, a supervisor, or a super user; and
wherein the state identifies at least one of the current actor that has authority or a pending action.

3. The autonomous vehicle as claim 1 recites, wherein:
the guidance comprises at least one of a confirmation, a collaborative instruction, or a command; and
controlling the component comprises at least one of:
generating a trajectory for controlling motion of the autonomous vehicle;
controlling an emitter of the autonomous vehicle; or
modifying an interior condition of the autonomous vehicle.

4. The autonomous vehicle as claim 1 recites, wherein the instructions further cause the autonomous vehicle to:
receive, via the network interface and from a second actor, guidance;
determine, based at least in part on evaluating a state machine, that a second condition associated with the second state is not satisfied based at least in part on determining that at least one of a role associated with the second actor is not associated with a sufficient privilege associated with the guidance, the guidance is not associated with a second action associated with the second condition, or the second state does not identify the second actor; and
maintain the second state, based at least in part on determining that the second condition is not satisfied.

5. The autonomous vehicle as claim 1 recites, wherein the instructions further cause the autonomous vehicle to:
receive, via the network interface and from the first actor, at least one of a relinquish message, a handoff message, or an escalation message;
receive, via the network interface, a third request to transfer to a second actor the authority to provide guidance; and
update, based at least in part on determining that a second condition specified by the policy stored in the memory is satisfied and the at least one of the relinquish message, the handoff message, or the escalation message, the second state to a third state identifying the second actor as having authority.

6. The autonomous vehicle as claim 5 recites, wherein:
the third request comprises a takeover message associated with the escalation message; and
determining that the second condition is satisfied is based at least in part on determining that a second role associated with the second request indicates that the second actor is a supervisor.

7. The autonomous vehicle as claim 1 recites, wherein the instructions further cause the autonomous vehicle to:
receive, via the network interface, a third request to transfer to a second actor authority to provide guidance; and
determine to reject the third request, based at least in part on determining that the third request is an invalid transfer according to the policy based at least in part on determining that the third request does not satisfy a second condition of the policy associated with the second state, wherein determining that the third request does not satisfy the second condition is based at least in part on determining that at least one of:
a handoff message, an escalation message, or relinquish message has not been received from the first actor, or
a second role associated with the second actor does not include an identification of a supervisor role.

8. The autonomous vehicle as claim 1 recites, wherein the instructions further cause the autonomous vehicle to:
replace the second state with the first state identifying the autonomous vehicle as having the authority based at least in part on at least one of:
receiving, via the network interface and from the first device, a relinquish message, or
determining that a time period has lapsed since a last keepalive message was received via the network interface from the first device.

9. A non-transitory computer-readable medium storing processor-executable instructions that, when executed by one or more processors, cause the one or more processors to:
store a policy associating at least one of a state, a role, or an action;
store a first state identifying a default actor as having authority to provide guidance to an autonomous vehicle;
transmit, via a network interface and to a first computing device associated with a first actor, the first state;
receive, via the network interface and from the first computing device, a first request to transfer authority to the first actor, the first request specifying at least one of an identifier of the first actor, an action, or a role, wherein the default actor and the first actor are each individual entities;
determine to deny the first request based at least in part on determining that a teleoperations request was not received from the autonomous vehicle, the teleoperations request identifying a classification of guidance to be given to the autonomous vehicle;
receive, from the autonomous vehicle, the teleoperations request;
receive, via the network interface and from the first computing device, a second request to transfer authority to the first actor;
update the state to obtain a second state and identify the first actor as having the authority and excluding other actors from having the authority, based at least in part on determining that the teleoperations request was received and determining that the second request satisfies a condition specified by the policy;
transmit, via the network interface to the first computing device, the second state; and
control a device associated with the non-transitory computer-readable medium based at least in part on receiving guidance via the network interface from the first computing device associated with the first actor and based at least in part on the state identifying the first actor as having the authority.

10. The non-transitory computer-readable medium as claim 9 recites, wherein:
the action comprises at least one of a takeover by the first actor, a handoff from the default actor to the first actor, or an escalation from the default actor to the first actor; and
the role comprises at least one of a teleoperator, a ride operator, a supervisor, or a super user.

11. The non-transitory computer-readable medium as claim 9 recites, wherein determining that the action or the role satisfy the condition specified by the policy comprises determining that a state machine transition is valid, a valid transition comprising:
a first transition from an actor to another actor when a handoff message is first received from the actor;

a second transition from the actor to a supervisor when an escalation message is first received from the actor and a takeover message is received from the supervisor;

a third transition from the actor to the supervisor when an emergency event indicator is first received;

a fourth transition from the actor to the supervisor when a computing device associated with the actor is inactive;

a fifth transition from the actor to the supervisor when the supervisor overrides the policy based at least in part on indicating aberrant behavior at the computing device associated with the actor;

a sixth transition from the actor to another actor based at least in part on determining that a keepalive message has not been received within a period of time; or a seventh transition from the actor to a device or the default actor when a relinquish message has been received from the actor.

12. The non-transitory computer-readable medium as claim 9 recites, wherein:

the guidance comprises at least one of a confirmation, a collaborative instruction, or a command; and controlling the device comprises at least one of:
generating a trajectory for controlling motion of the autonomous vehicle;
controlling an emitter of the autonomous vehicle; or
modifying an interior condition of the autonomous vehicle.

13. A method comprising:

storing a first state identifying a first actor as having authority to provide guidance to an autonomous vehicle;

storing a policy specifying one or more conditions associated with transferring authority between actors, the one or more conditions comprising a first condition that requires that a teleoperations request must be received from the autonomous vehicle before authority is transferred and at least one of an action, a role, or a state;

receiving, from a second actor, a first request to transfer authority to the second actor, wherein transferring the authority to the second actor would grant the second actor sole authority to provide guidance to the autonomous vehicle; and one of:

determining to deny the first request based at least in part on determining that the teleoperations request was not received from the autonomous vehicle; or updating the first state, as a second state, to identify the second actor as having the authority based at least in part on determining that the teleoperations request was received from the autonomous vehicle and a second action or a second role associated with the first request fulfills a first condition of the policy, wherein the second state excludes a third actor different from the second actor from providing guidance to the autonomous vehicle.

14. The method as claim 13 recites, wherein the method further comprises:

receiving, from a first computing device associated with the first actor, first guidance;

receiving, from a second computing device associated with a second actor, second guidance; and determining to control a component of the autonomous vehicle based at least in part on the second guidance based at least in part on determining that the second state identifies the second actor as having authority and based at least in part on determining that the second role is associated with a privilege associated with the component.

15. The method as claim 13 recites, wherein updating the first state to identify the second actor as having the authority is based at least in part on at least one of:

determining that an identifier associated with an identity of the second actor is authorized to take authority;

determining that the second role associated with the second actor is specified by the first condition;

determining that the second action is specified by the first condition;

determining that the second actor and the first request are associated with at least one of a handoff message or an escalation message received from the first actor; or determining that a relinquish message was received from the first actor.

16. The method as claim 13 recites, wherein the first actor is associated with a first device and the method further comprises:

transmitting, to one or more devices subscribing to publications of the first device over a state channel, at least one of the first state or the second state.

17. The method as claim 13 recites, wherein:

updating the first state to identify the second actor is based at least in part on determining, by evaluating a state machine, that a transition from the first actor to the second actor is valid, wherein a valid transition comprises:

a first transition from the first actor to the second actor when a handoff message is first received from the first actor;

a second transition from the first actor to a supervisor when an escalation message is first received from the actor and a takeover message is received from the supervisor, the supervisor being the second actor;

a third transition from the first actor to the supervisor when an emergency event indicator is first received, the supervisor being the second actor;

a fourth transition from the first actor to the supervisor when a computing device associated with the actor is inactive, the supervisor being the second actor;

a fifth transition from the first actor to the supervisor when the supervisor overrides the policy based at least in part on indicating aberrant behavior at the computing device associated with the actor, the supervisor being the second actor;

a sixth transition from the first actor to the second actor based at least in part on determining that a keepalive message has not been received within a period of time; or a seventh transition from the first actor to a device when a relinquish message has been received from the first actor.

18. The method as claim 13 recites, wherein:

updating the first state to identify the second actor as having the authority comprises storing at least one of an identifier associated with the second actor, the second role, or a status of a transition; and publishing, to one or more computing devices, the first state.

19. The method of claim 13, wherein the second actor is associated with a remote computing device and the sole authority to provide guidance to the autonomous vehicle is associated with remote operations between the remote computing device and the autonomous vehicle.

* * * * *